(12) United States Patent
Sueshige

(10) Patent No.: US 9,213,508 B2
(45) Date of Patent: Dec. 15, 2015

(54) INFORMATION PROCESSING APPARATUS, PRINT SETTING METHOD, AND STORAGE MEDIUM

(75) Inventor: Yoshiko Sueshige, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 13/399,880

(22) Filed: Feb. 17, 2012

(65) Prior Publication Data

US 2012/0224207 A1  Sep. 6, 2012

(30) Foreign Application Priority Data

Mar. 2, 2011  (JP) ................................ 2011-045481

(51) Int. Cl.
*G06F 3/12* (2006.01)

(52) U.S. Cl.
CPC .............. *G06F 3/1244* (2013.01); *G06F 3/122* (2013.01); *G06F 3/1205* (2013.01); *G06F 3/1255* (2013.01); *G06F 3/1288* (2013.01); *G06F 3/1208* (2013.01); *G06F 3/1254* (2013.01)

(58) Field of Classification Search
CPC combination set(s) only.
See application file for complete search history.

(56) References Cited

U.S. PATENT DOCUMENTS 6,330,067 B1 * 12/2001 Murata ......................... 358/1.12
7,903,272 B2 * 3/2011 Kato ............................. 358/1.15
8,009,310 B2 * 8/2011 Tanaka et al. ................. 358/1.15
8,259,317 B2 * 9/2012 Saito ............................ 358/1.13
2003/0053129 A1 * 3/2003 Morooka et al. ............. 358/1.15
2004/0017580 A1 * 1/2004 Kuroda ........................ 358/1.13
2008/0144087 A1 * 6/2008 Mitsui ......................... 358/1.15
2010/0195132 A1 * 8/2010 Takashima ................... 358/1.13
2010/0220347 A1 * 9/2010 Oeters et al. ................. 358/1.13
2011/0116131 A1 * 5/2011 Mitsui ......................... 358/1.15

FOREIGN PATENT DOCUMENTS

JP        2010-40002 A    2/2010

* cited by examiner

*Primary Examiner* — Hilina K Demeter
(74) *Attorney, Agent, or Firm* — Canon USA, Inc. IP Division

(57) ABSTRACT

An information processing apparatus includes a printer driver, a reception unit, a first and second determination unit, a transmission unit, and a change unit to instruct, via the printer driver, a printer to execute printing. The reception unit receives print data including setting data having setting values for print setting items. The first determination unit determines whether setting values cause an inconsistency. The second determination unit determines whether the client apparatus or the information processing apparatus is to resolve an inconsistency. The transmission unit transmits, in response to determining that the setting values cause an inconsistency and that the client apparatus is to resolve the inconsistency, an instruction for resolving the inconsistency to the client apparatus. The change unit changes, in response to determining that the setting values cause an inconsistency and that the information processing apparatus is to resolve the inconsistency, the setting data to resolve the inconsistency.

12 Claims, 21 Drawing Sheets

| PAPER TYPE | BORDERLESS PRINTING | PAPER SIZE | PAPER FEED PORT | TWO-SIDED PRINTING |
|---|---|---|---|---|
| PLAIN PAPER ◎ | OFF ◎ | A4 ◎ | TRAY A ◎ | OFF ◎ |
| | | | | ON |
| | | | TRAY B | OFF ◎ |
| | | | | ON |
| | | A5 | TRAY B | OFF ◎ |
| | | | | ON |
| | ON | A4 ◎ | TRAY A ◎ | OFF ◎ |
| | | | | ON |
| | | | TRAY B | OFF ◎ |
| | | | | ON |
| GLOSSY PAPER | OFF ◎ | A4 ◎ | TRAY A ◎ | OFF ◎ |
| | | 2L | TRAY A ◎ | OFF ◎ |
| | | A5 | TRAY A ◎ | OFF ◎ |
| | ON | A4 ◎ | TRAY A ◎ | OFF ◎ |
| | | 2L | TRAY A ◎ | OFF ◎ |

(◎: DEFAULT VALUE)

| UI LEVEL | SETTING ITEM INFORMATION |
|---|---|
| 0 | ALL THE SETTING ITEMS |
| 1 | PAPER SIZE |
| 2 | PAPER SIZE/PAPER TYPE |
| 3 | PAPER SIZE/ TWO-SIDED PRINTING |
| . . . | . . . |
| NOT SPECIFIED | N/A |

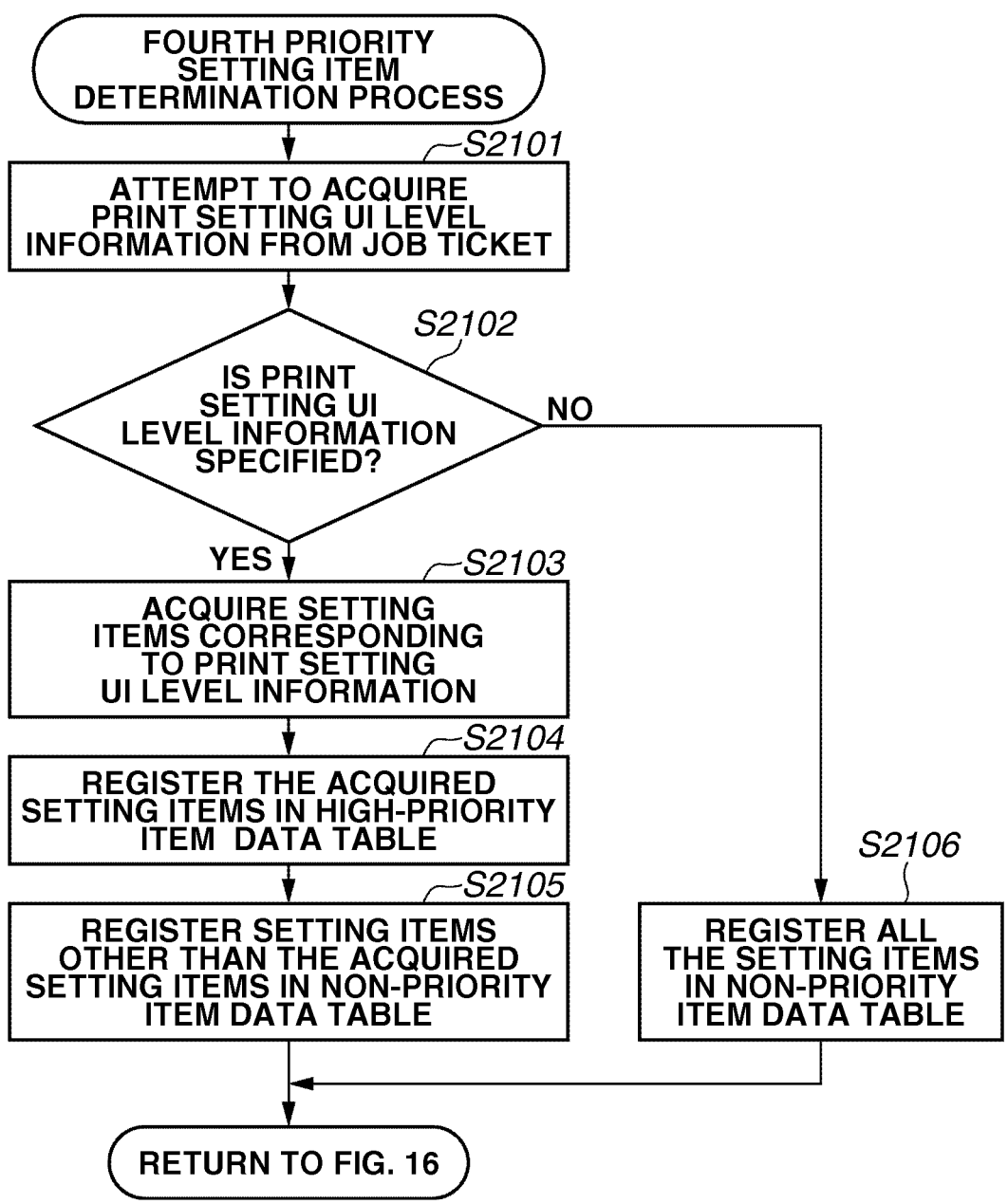

INFORMATION PROCESSING APPARATUS, PRINT SETTING METHOD, AND STORAGE MEDIUM

BACKGROUND OF THE INVENTION

1. Field of the Invention

The present invention relates to an information processing apparatus, a print setting method, and a computer program.

2. Description of the Related Art

Generally, in a printing system including a host computer and a printer, a printer driver included in the host computer specifies various print settings such as paper sizes and paper types. However, the printer driver cannot set all the combinations of these print settings. For example, if the setting value for the paper type represents "photo paper," printing can only be executed on the front side of the paper. Namely, this setting cannot be combined with two-sided printing. Thus, among a plurality of print setting items, if a combination of setting values that cannot coexist between print setting items is generated, inconsistency is caused between the setting values. To avoid such inconsistency, the printer driver sets the dependence relationship among the print setting items. In the following description, such inconsistency between setting values will be referred to as a conflict, as needed. Based on the dependence relationship among the print setting items, a setting value for a certain print setting item limits setting values that can be set for other print setting items. Namely, if the paper type "photo paper" limits the setting of two-sided printing to "OFF," the paper type is a print setting item having a higher priority than the print setting item "two-sided printing."

The printer driver includes a user interface (print setting user interface (UI)) for receiving print settings from a user. The printer driver refers to the print settings set via this print setting UI and determines whether a conflict is caused between setting values, based on priorities uniquely held by the printer driver. If a conflict is found between setting values, the printer driver forcibly changes a setting value having the lower priority. Alternatively, the printer driver notifies the user of occurrence of the conflict and requests the user to change the print settings. In this way, the printer driver resolves the conflict.

In addition, to realize printing irrespective of the priorities of the print settings uniquely held by the printer driver, Japanese Patent Application Laid-Open No. 2010-40002 discusses a method of allowing a user to specify priority print settings. According to this method, the printer driver has a method of fixing print settings, in view of conflict rules avoiding a conflict of print settings. If a print setting is fixed, the priority thereof in the conflict rules can be set to be higher than the previous priority.

However, the printer driver cannot always provide a method of notifying the user of occurrence of a conflict, changing print settings, or specifying priorities desired by the user. Recently, the number of people wishing to execute printing with a small communication terminal such as a mobile terminal has been rapidly increasing. Normally, if a user executes printing with a personal computer and a printer, a printer driver corresponding to the printer needs to be previously installed in the personal computer. Thus, printer vendors provide printer drivers corresponding to various types of operating system (OS), such as "Windows (registered trademark)" and "Mac OS (registered trademark)," installed in personal computers.

Generally, an OS installed in a small communication terminal such as a mobile terminal does not have a mechanism for installing a printer driver. This is because, unlike that in a personal computer, the memory capacity that can be installed in a mobile terminal is limited. Even if an OS installed in a mobile terminal has a mechanism for installing a printer driver, it is difficult to install printer drivers provided by printer vendors in a mobile terminal. Thus, it is necessary to achieve a method for executing printing from a mobile terminal independent of printer drivers.

Generally, two processes are conceivable to realize printing from an apparatus in which no printer driver is installed. In the first printing process, a mobile terminal generates print data and directly sends the data to a printer. In this mode, to realize direct data exchange between the mobile terminal and the printer, the printer driver needs to have a special mechanism, instead of a mechanism that is independent of printer drivers. It is difficult to easily realize such mechanism.

In the second printing process, a host computer connected to a printer functions as a print server. More specifically, the host computer receives print data via a print request from a mobile terminal via a network. Based on the print data, a printer driver included in the host computer generates a print job suitable for the printer and sends the print job to the printer. In this mode, a mechanism that is the same as a network printing system in which a plurality of host computers share a printer on a network can be used. Thus, unlike the above first printing process, the second printing process can be realized easily by using an existing printer. In a general network printing system, a printer driver corresponding to a printer to be used needs to be installed in advance in a host computer used as a client.

If a client is a mobile terminal and if a printer driver corresponding to a printer to be used is not installed in the mobile terminal, the mobile terminal often uses a general-purpose application provided by a printer vendor to execute printing that is independent of printer drivers. Such general-purpose applications that can operate in mobile terminals are different from printer drivers produced specifically for corresponding printer models. Namely, such general-purpose application cannot completely grasp all the functions of a printer and includes only a general-purpose print setting UI. Accordingly, such a general-purpose application cannot set functions unique to the printer. Thus, print data generated by the client may be insufficient. For example, the print data may lack necessary print setting information or a conflict of setting values among print setting items may remain. To solve such problems, when a printer driver installed in a print server receives print data generated by a client, the printer driver executes a process of supplementing the insufficient print setting information or a process of resolving a conflict of setting values among print setting items.

However, even if the printer driver in the print server notifies the user of occurrence of a conflict and prompts the user to change a print setting, there are cases where the general-purpose application of the client cannot change the target setting item. In such case, since the user cannot change the print setting, the conflict of setting values among the print setting items cannot be resolved. In addition, there are general-purpose applications that cannot notify users of error information sent from print servers. In this case, even if the print server supplies the client with conflict information as an error message, the client cannot recognize the error message and stoppage of printing. Namely, the user cannot recognize why printing cannot be completed.

In addition, in a local printing system where a single host computer and a single printer are connected to each other, some of the programs or applications issuing a print request directly execute print processing, without using a print setting UI of a printer driver. In this case, too, in the mode where the printer driver notifies information indicating occurrence of a conflict of setting values among print settings or information prompting resetting of print settings, the user may not be sure about a method of changing the print settings.

SUMMARY OF THE INVENTION

The present invention is directed to supplement of print settings based on client environments and prevention of a conflict of setting values among print settings.

According to an aspect of the present invention, an information processing apparatus including a printer driver and configured to instruct, via the printer driver, a printer to execute printing, the information processing apparatus includes a reception unit configured to receive print data including setting data, wherein the setting data includes at least setting values for print setting items from a client apparatus, a first determination unit configured to determine whether setting values for print setting items in the setting data cause an inconsistency, a second determination unit configured to determine, based on the print data, whether the client apparatus is to resolve an inconsistency or the information processing apparatus is to resolve an inconsistency, a transmission unit configured to transmit, in response to the first determination unit determining that the setting values cause an inconsistency and the second determination unit determining that the client apparatus is to resolve the inconsistency, an instruction for resolving the inconsistency to the client apparatus, and a change unit configured to change, in response to the first determination unit determining that the setting values cause an inconsistency and the second determination unit determining that the information processing apparatus is to resolve the inconsistency, the setting data to resolve the inconsistency.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a data table illustrating the dependence relationship among print setting items.

FIG. 15 illustrates a UI level definition table.

FIG. 21 is a flow chart illustrating a fourth priority setting item determination processing.

DESCRIPTION OF THE EMBODIMENTS

Various exemplary embodiments, features, and aspects of the invention will be described in detail below with reference to the drawings. In an example, a host computer determines print setting items that can be set by a print setting user interface (UI) of a client apparatus, based on setting values for print setting items written in a job ticket sent from the client apparatus. The host computer determines whether a conflict of setting values is caused among the print setting items, based on a data table. If the conflict is determined, the host computer determines a print setting item causing the conflict to be a print setting item that needs to be reset, based on priorities uniquely held by a printer driver. If the client apparatus does not include a print setting UI capable of setting the print setting item that needs to be reset, the printer driver resets the print setting item with a setting value.

Figure 1:
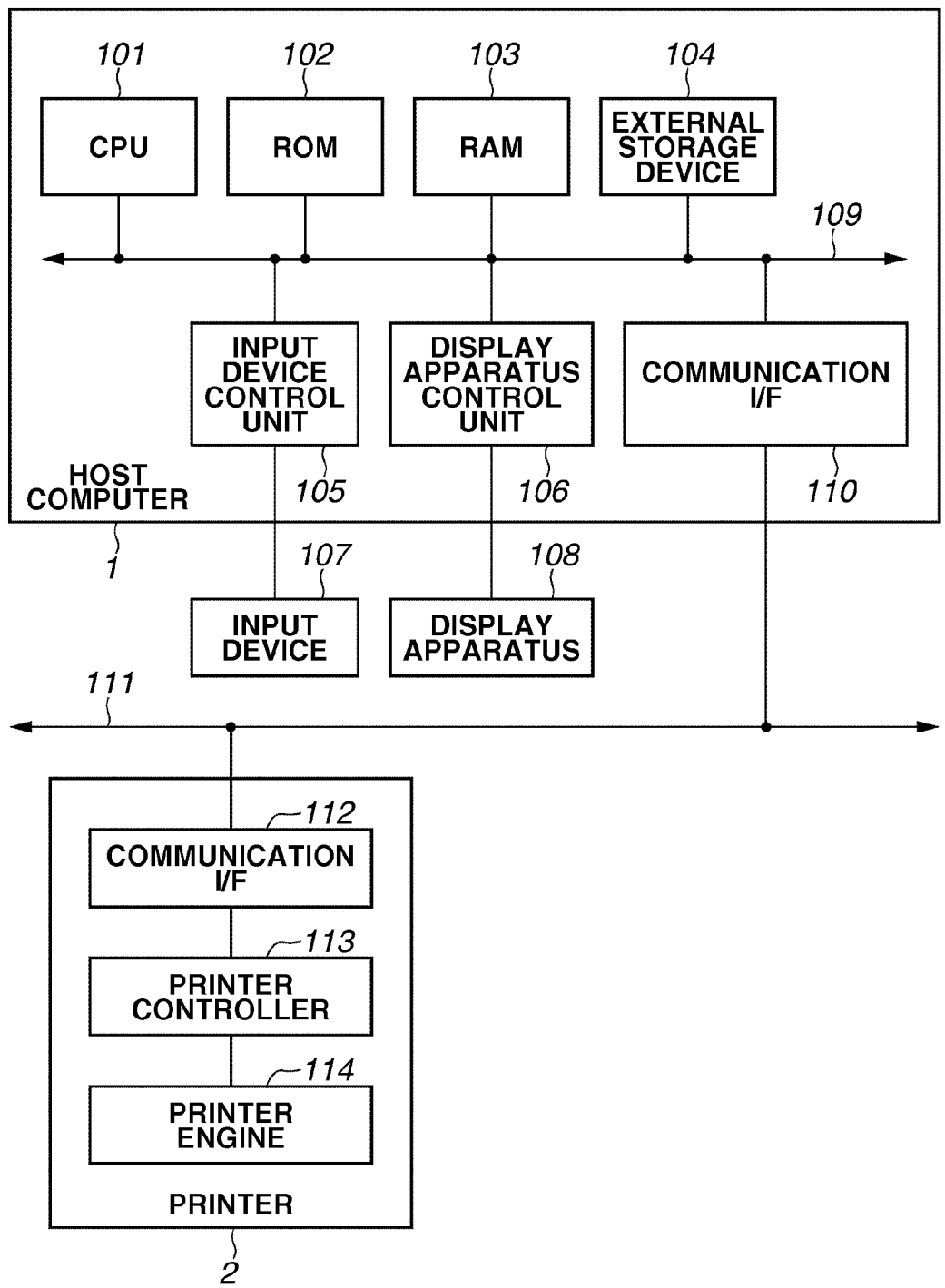
FIG. 1 illustrates a configuration of a printing system.

FIG. 1 illustrates a configuration of a printing system according to a first exemplary embodiment. In FIG. 1, a host computer 1 and a printer 2 can communicate with each other via a communication bus 111 such as Ethernet or a universal serial bus (USB). In the present exemplary embodiment, an OS equivalent to "Mac OS (registered trademark) X" is installed in the host computer 1. While FIG. 1 illustrates only one printer 2, an arbitrary number of printers can be connected to and communicate with the host computer 1 via the communication bus 111.

In the host computer 1, a central processing unit (CPU) 101 controls various units in accordance with computer programs stored in a random access memory (RAM) 103 and an external storage device 104. The CPU 101 executes a printer driver compatible with the printer 2, converts output information generated based on an application program into an output command compatible with the printer 2, and outputs the output command to the printer 2 by using a predetermined protocol. A read-only memory (ROM) 102 stores a basic input output system (BIOS) program executed by the CPU 101, font data, and the like.

The CPU 101 uses the RAM 103 as needed when writing/reading data. When booting the printer driver, the CPU 101 loads program code of the printer driver into the RAM 103. The external storage device 104 stores the program code read by the CPU 101. The external storage device 104 realizes some of the functions in the present exemplary embodiment and is a floppy disk (FD), a compact disc-rewritable (CD-RW), or a hard disk drive (HDD), for example. An input device control unit 105 controls an input device 107 such as a keyboard or a mouse. A display apparatus control unit 106 controls a display apparatus 108 such as a cathode ray tube (CRT). An internal bus 109 is configured by a data bus and a system bus to allow data communication among various components. A communication interface (I/F) 110 is connected to a communication bus 111 so that the host computer 1 can mutually communicate with the printer 2.

When a serial interface is used, a USB, the Institute of Electrical and Electronics Engineers (IEEE) 1394, or the like may be used. When a parallel interface is used, Centronics, a small computer system interface (SCSI), or the like may be used. If a network is used, Ethernet, a wireless local area network (LAN) (IEEE802.11), or the like may be used. However, the communication I/F 110 may be any type of interface, as long as the host computer 1 and the printer 2 can mutually communicate with each other.

In the printer 2, a printer controller 113 executes printing, by controlling a printer engine 114 based on a printer command supplied via a communication I/F 112. The printer engine 114 is a mechanism for operating printer heads and conveying a recording medium.

Figure 2:
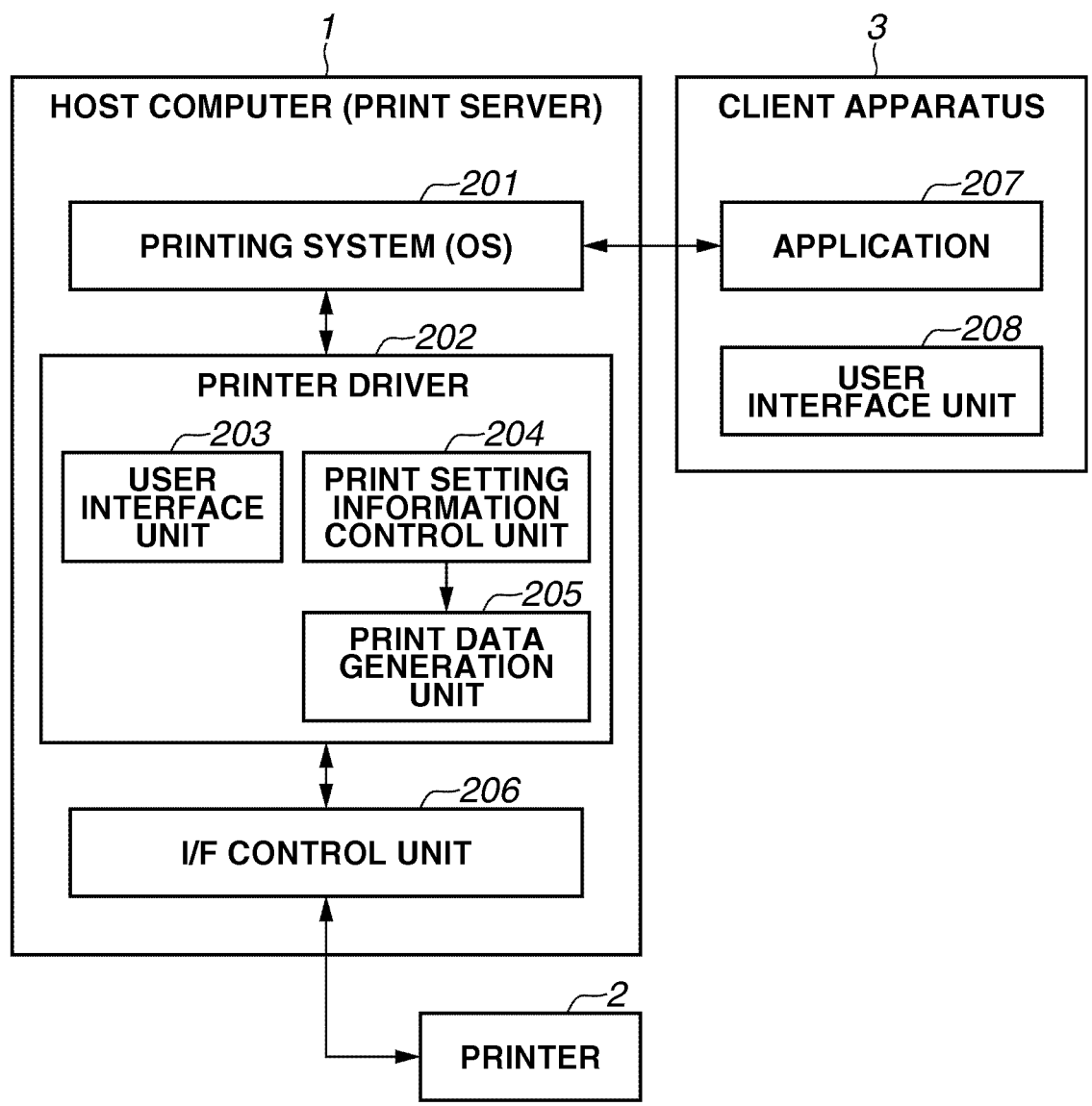
FIG. 2 illustrates configurations of a host computer and a client apparatus.

FIG. 2 illustrates software configurations of the host computer 1 used as a print server and a client apparatus 3. The host computer 1 is an information processing apparatus including a printing system 201, a printer driver 202, and an I/F control unit 206. After receiving print data from the client apparatus 3, the host computer 1 sends the print data to the printing system 201 and the printer driver 202. The printing system 201 and the printer driver 202 convert the print data into a print job processable (printable) by the printer 2 and output the print job to the printer 2.

The printing system 201 is a print control program of the OS and manages overall print processing executed by the printer 2. This printing system 201 is configured by programs for executing various print control operations, such as a program for a spooling process for managing print data supplied from an application and a program for loading/executing of the printer driver 202.

The printer driver 202 includes a user interface unit 203, a print setting information control unit 204, and a print data generation unit 205. The user interface unit 203 includes a print setting UI for setting all the print setting items that can be set in the printer 2. Upon receiving print setting instructions from a user, the user interface unit 203 controls the printer driver 202 based on setting values corresponding to the instructions. An application issuing a print request causes the display apparatus 108 to display the print setting UI provided by the user interface unit 203 via the printing system 201. In this way, the print setting UI receives print setting information compatible with the printer 2. The application generates print data, based on print setting information sent from the user interface unit 203. However, this application signifies an application (not illustrated) included in the host computer 1. Namely, this application is used when the host computer 1 operates in a local printing system where the host computer 1 directly causes the printer 2 connected thereto to execute printing.

Figure 3:
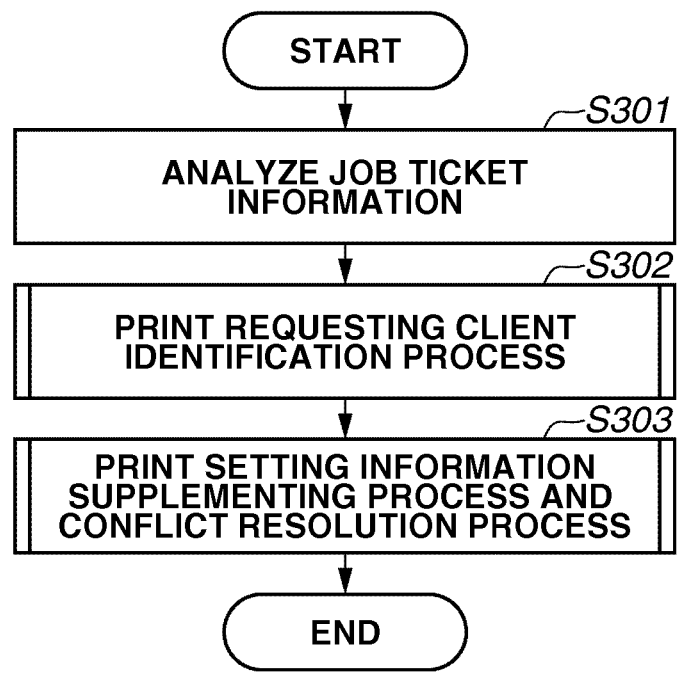
FIG. 3 is a flowchart illustrating a process executed by a print setting information control unit.

After the printer driver 202 receives print data, first, the print setting information control unit 204 processes the print data. FIG. 3 is a flow chart illustrating a process executed by the print setting information control unit 204. After the printer driver 202 receives print data from the client apparatus 3, first, in step S301, the print setting information control unit 204 analyzes job ticket information added to the print data.

Next, in step S302, the print setting information control unit 204 executes a print requesting client identification process. More specifically, based on the job ticket information analyzed in step S301, the print setting information control unit 204 determines which client apparatus 3 has issued the print request. Namely, the print setting information control unit 204 identifies the type of the client apparatus 3.

Lastly, in step S303, the print setting information control unit 204 executes a print setting information supplementing process and a conflict resolution process. Namely, based on the client type determined in step S302, the print setting information control unit 204 determines whether the print setting information is insufficient for the printer 2 to execute printing. If necessary, the print setting information control unit 204 supplements the print setting information with appropriate setting values. In addition, if a conflict of setting values is caused, the print setting information control unit 204 executes a process for resolving the conflict. In this way, in view of all the print setting items held by the printer driver 202, the print setting information control unit 204 controls the print setting information, so that a combination of print settings operable by the printer 2 can be obtained.

The print data generation unit 205 generates a print job in data format interpretable by the printer 2, based on the print setting information and the print data. This print job is output to the printer 2 via the I/F control unit 206. In this way, the host computer 1 instructs the printer 2 to execute printing.

The client apparatus 3 includes an application 207 and a user interface unit 208. To share the printer 2 connected to the host computer 1 via the communication bus 111 (network), the client apparatus 3 sends a print request to the host computer 1. The application 207 generates/edits print data to be printed and sends such generated print data to the printing system 201 of the OS in the host computer 1 via a network. The user interface unit 208 includes a print setting UI for setting print setting information and receives print setting information from a user via the print setting UI. In this way, the user interface unit 208 generates print setting information based on setting values corresponding to the user instructions. If the client apparatus 3 has the same software configuration as that of the host computer 1, the printer driver 202 (not illustrated) compatible with the printer 2 is also installed in the client apparatus 3. In this case, the user interface unit 208 in the client apparatus 3 is the same as the user interface unit 203 in the printer driver 202. Thus, the client apparatus 3 can set print setting information compatible with the printer 2.

On the other hand, if the client apparatus 3 is an apparatus such as a mobile terminal in which the printer driver 202 is not installed, the user interface unit 208 included in the client apparatus 3 displays a general-purpose print setting UI provided by the application 207. In this case, the user interface unit 208 sets only the general-purpose print setting information that may not be compatible with the printer 2, based on user instructions input to the print setting UI. In this way, the application 207 generates print data, based on the print setting information sent from the user interface unit 208. For example, in the Mac OS (registered trademark) X system, a print object for controlling print setting information added to such print data is prepared. This print object is also referred to as a job ticket and stores printer information and various setting data necessary for the printer 2 to execute printing.

Figure 4A:
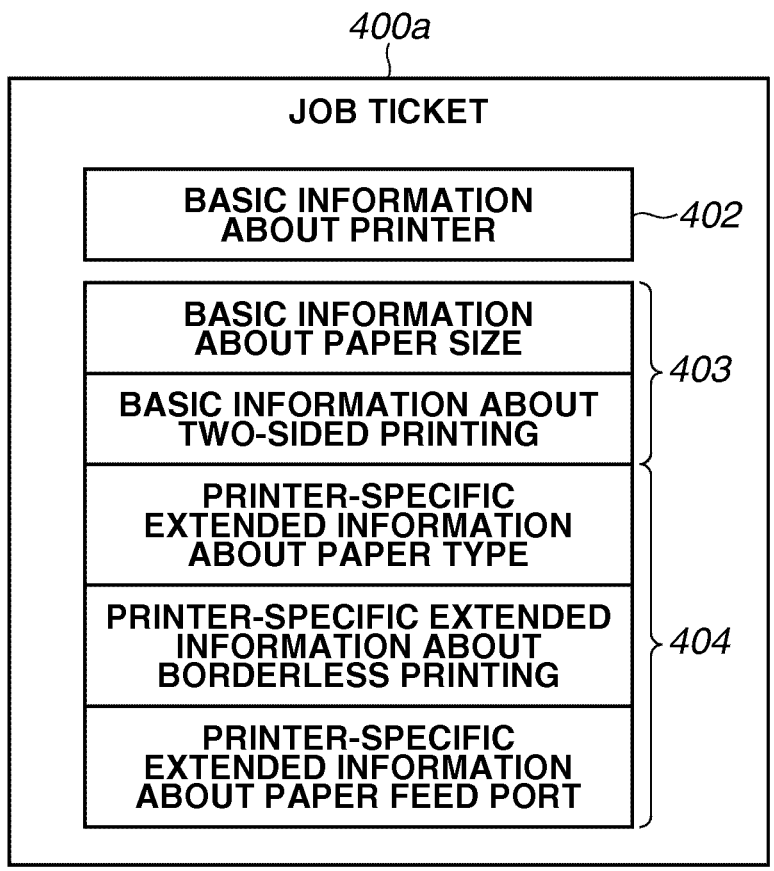
FIGS. 4A and 4B illustrate first and second examples of a job ticket data configuration, respectively.
Figure 4B:
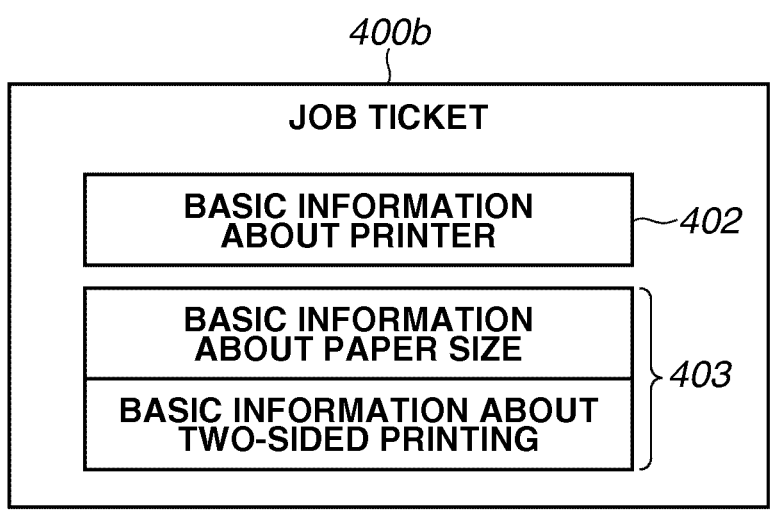

FIGS. 4A and 4B illustrate data configurations of job tickets generated by the application 207. FIG. 4A illustrates a job ticket 400*a* storing all the information necessary for the printer 2 to execute printing. More specifically, the job ticket 400*a* includes: basic information 402 about the printer 2, such as about the name of a currently-selected printer; basic information 403 about general print setting information, such as about the paper size and two-sided printing; and extended information 404 such as about print settings unique to the printer 2. If the client apparatus 3 includes the printer driver 202, since the user can set print setting information via the print setting UI provided by the printer driver 202, the user can set functions that can be set in the printer 2. In this case, the user interface unit 203 of the printer driver 202 writes print setting items corresponding to all the functions of the printer 2 in the job ticket 400, as the print setting information.

On the other hand, if the client apparatus 3 does not include the printer driver 202, contents of the print setting information that can be written in the job ticket 400 vary depending on the OS or application included in the client apparatus 3. For example, if the client apparatus 3 cannot grasp any information about functions of the printer 2, the application 207 generates a job ticket 400b as illustrated in FIG. 4B. The client apparatus 3 can only write setting values corresponding to print setting items that can be set by a general-purpose print setting UI in this job ticket 400b, as the print setting information. Namely, while the application 207 generates the job ticket 400b, no extended information 404 such as about print settings unique to the printer 2 is written in the job ticket 400b.

In addition, there is another type of client apparatuses 3 that can grasp information about functions of the printer 2, although the application 207 includes only a general-purpose print setting UI. The application 207 acquires information about functions of the printer 2 from the printer driver 202 via the printing system 201 of the OS included in the host computer 1 via a network. The application 207 writes setting values for the print setting items set by the general-purpose print setting UI in the job ticket 400 as print setting information. In addition, based on the function information acquired from the printer driver 202, the application 207 writes some setting values for the setting items held by the printer 2 in the job ticket 400, as print setting information. The job ticket 400 generated in this way seems to look the same as the job ticket 400a in FIG. 4A in which setting values have been written for the print setting items corresponding to the functions of the printer 2. However, in reality, the dependence relationship among the print setting items held by the printer driver 202 is not considered.

Figure 5:
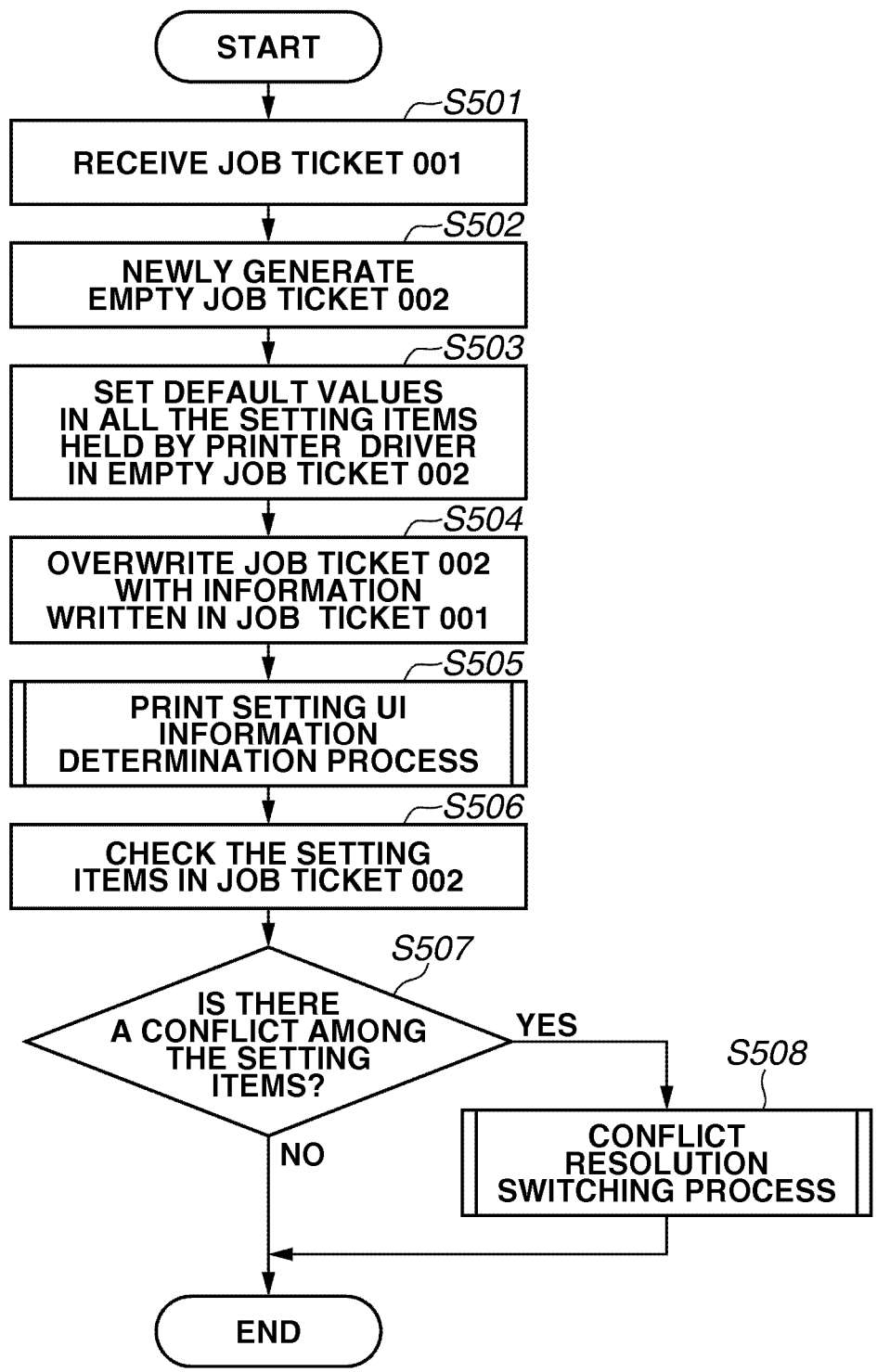
FIG. 5 is a flow chart illustrating a first example of a process executed by the print setting information control unit during print processing.

Thus, job ticket information generated by the client apparatus 3 that does not include the printer driver 202 may lack information necessary for the printer 2 to execute printing. In addition, with such job ticket information, a conflict of setting values may be caused among print setting items. Namely, the job ticket information may vary depending on the type of the client apparatus 3. FIG. 5 is a flow chart illustrating a process executed by the print setting information control unit 204 of the printer driver 202 in the host computer 1. More specifically, in accordance with this process, the print setting information control unit 204 analyzes contents of the job ticket information added to the print data and sets appropriate setting values for all the print setting items necessary for the printer 2 to execute printing. The CPU 101 realizes each of the steps in this flow chart by reading relevant programs from a memory and executing the programs.

First, in step S501, the print setting information control unit 204 receives print setting information added to the print data from the application 207, as a job ticket 001. Next, in step S502, the print setting information control unit 204 newly generates a job ticket 002, which is an empty print object. Next, in step S503, the print setting information control unit 204 sets default values in all the print setting items held by the printer driver 202 in the job ticket 002. Next, in step S504, the print setting information control unit 204 overwrites the job ticket 002, in which the default values are set in step S503, with the information written in the job ticket 001 supplied from the application 207 in step S501. As a result, among all the print setting items of the printer driver 202 held by the job ticket 002, the setting values written in the job ticket 001 are set for the setting items corresponding to the setting items written by the application 207. However, in the job ticket 002, default values are set for the setting items that are not written by the application 207.

Next, in step S505, the print setting information control unit 204 executes a print setting UI information determination process. While this process will be described in more detail in the following description, the print setting information control unit 204 determines which type of print setting UI is included in the client apparatus 3 sending the print request, based on the information written in the job ticket 001. In the present exemplary embodiment, the print setting information control unit 204 executes step S505 to determine the print setting items specified by the client apparatus 3. Next, in step S506, the print setting information control unit 204 checks each of the print setting items in the job ticket 002, in which setting values have been set for all the print setting items held by the printer driver 202. Next, in step S507, the print setting information control unit 204 determines whether a conflict (inconsistency) of setting values is caused among the print setting items, based on priorities uniquely held by the printer driver 202.

Hereinafter, based on an example, the priorities uniquely held by the printer driver 202 will be described in detail. The priorities uniquely held by the printer driver 202 are determined based on the dependence relationship that exists among the individual print setting items held by the printer driver 202. FIG. 6 is a data table illustrating the dependence relationship among the individual print setting items held by the printer driver 202. In the data table 600 in FIG. 6, a print setting item indicated on the left side of another print setting item has a higher priority. Namely, a setting value for one print setting item is limited by a setting value for another print setting item indicated on the left side of the one print setting item. More specifically, selectable setting values for the print setting item "borderless printing" are determined based on a setting value for the print setting item "paper type." In addition, selectable paper sizes are determined based on setting values for the print setting items "paper type" and "borderless printing."

For example, if the setting values for the print setting items "paper type," "borderless printing," "paper size," and "paper feed port" indicate "plain paper," "OFF," "A4," and "paper feed tray A," respectively, selectable setting values for the print setting items "two-sided printing" are "ON" and "OFF." In contrast, if setting values for the print setting items "paper type," "borderless printing," "paper size," and "paper feed port" indicate "glossy paper," "OFF," "A4," and "paper feed tray A," respectively, only the setting value "OFF" can be set for "two-sided printing." In this way, the print setting information control unit 204 determines priorities of print setting items based on the dependence relationship among the print setting items. Thus, in view of the print setting items held by the printer driver 202, the print setting information control unit 204 can prevent generation of print setting information that is predicted to be inconvenient to the user or that requires the printer 2 to execute an impossible operation.

As described above, in step S507, the print setting information control unit 204 determines whether a conflict of setting values is caused among the print setting items. If it is determined that a conflict of setting values is caused among print setting items (YES in step S507), the operation proceeds to step S508, and the print setting information control unit 204 executes a conflict resolution switching process. On the other hand, if no conflict of setting values is caused among the print setting items (NO in step S507), the print setting information control unit 204 ends the process in the flowchart in FIG. 5.

Figure 7:
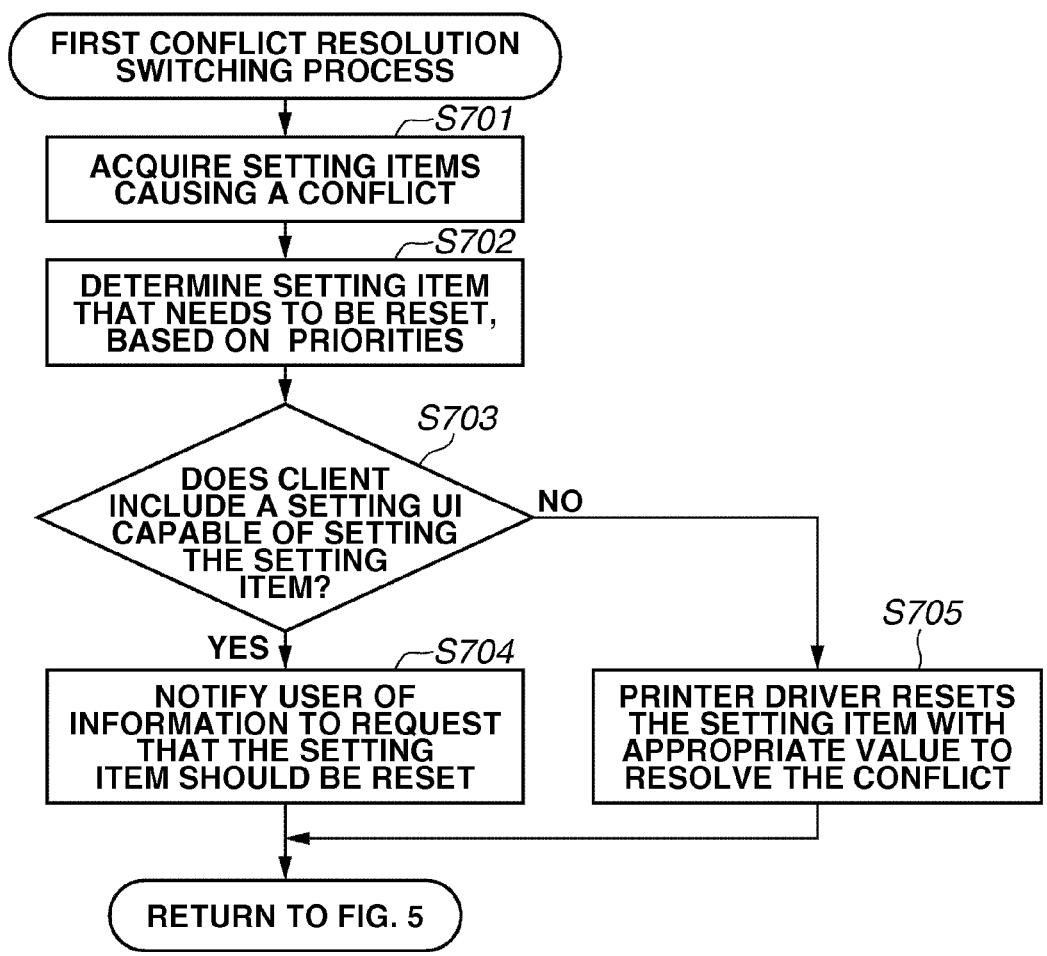
FIG. 7 is a flow chart illustrating a first conflict resolution switching process.
Figure 8:
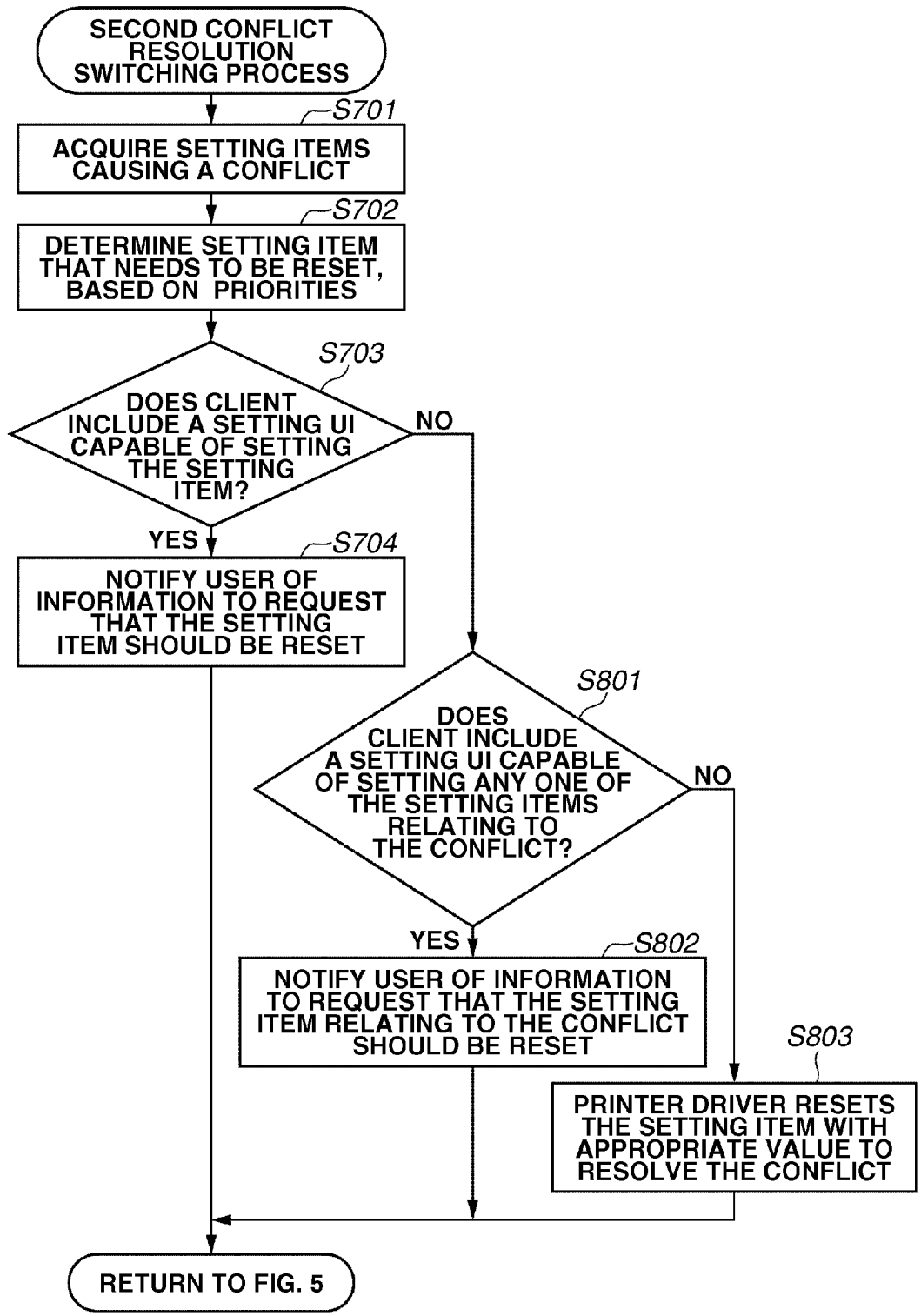
FIG. 8 is a flow chart illustrating a second conflict resolution switching process.

FIGS. 7 and 8 are flow charts illustrating first and second examples of the process in step S508 in FIG. 5, respectively. If a conflict is caused, the printer driver 202 executes one of the first and second conflict resolution processes. The first conflict resolution switching process illustrated in FIG. 7 is executed only when the client apparatus 3 includes a print setting UI capable of setting a print setting item having the lowest priority, among the print setting items causing the conflict. In this case, the print setting information control unit 204 notifies the user of information to request that the print setting item should be reset. On the other hand, the second conflict resolution switching process illustrated in FIG. 8 can be executed when the client apparatus 3 includes a print setting UI capable of setting any one of the print setting items relating to the conflict. In this case, the print setting information control unit 204 notifies the user of information to request that the print setting item should be reset.

Hereinafter, the first conflict resolution switching process in FIG. 7 will be described. First, in step S701, the print setting information control unit 204 acquires print setting items causing a conflict. Next, in step S702, among the print setting items causing a conflict, the print setting information control unit 204 determines a print setting item that needs to be reset, based on priorities uniquely held by the printer driver 202.

Next, in step S703, the print setting information control unit 204 determines whether the client apparatus 3 includes a print setting UI capable of setting the print setting item that needs to be reset. The type of the print setting UI included in the client apparatus 3 is determined by the process in step S505. If it is determined that the client apparatus 3 includes a print setting UI capable of setting the print setting item that needs to be reset (YES in step S703), the operation proceeds to step S704. In step S704, the print setting information control unit 204 notifies the user of the print setting item that needs to be reset, to request the user to reset the print setting item. On the other hand, if the client apparatus 3 does not include a print setting UI capable of setting the print setting item that needs to be reset (NO in step S703), the operation proceeds to step S705. In step S705, the print setting information control unit 204 causes the printer driver 202 to use an appropriate setting value to reset (change) the print setting item that needs to be reset. In this way, the print setting information control unit 204 resolves the conflict.

Next, the second conflict resolution switching process in FIG. 8 will be described. In FIG. 8, the same steps as those in FIG. 7 will not be described. Only the steps different between FIGS. 7 and 8 will be described. FIG. 8 includes different steps after the print setting information control unit 204 determines that the client apparatus 3 does not include a print setting UI capable of setting the print setting item that needs to be reset. Based on the process in FIG. 7, as described above, if the print setting information control unit 204 determines that the client apparatus 3 does not include a print setting UI capable of setting the print setting item that needs to be reset, to resolve the conflict, the printer driver 202 resets the print setting item with an appropriate setting value. In contrast, based on the process in FIG. 8, in step S801, the print setting information control unit 204 executes the following process. Namely, the print setting information control unit 204 determines whether the client apparatus 3 includes a print setting UI capable of setting any one of the print setting items relating to the conflict, even if the print setting item is not determined to be the print setting item that needs to be reset in step S702.

If it is determined that the client apparatus 3 includes a print setting UI capable of setting any one of the print setting items relating to the conflict (YES in step S801), the operation proceeds to S802. In step S802, the print setting information control unit 204 notifies the user of the print setting item that can be set by the client apparatus 3 (the print setting item that can be set, among the print setting items relating to the conflict) and requests the user to reset (change) the print setting. On the other hand, if the client apparatus 3 does not include a print setting UI capable of setting any one of the print setting items relating to the conflict (NO in step S801), the operation proceeds to step S803. In step S803, based on the priorities uniquely held by the printer driver 202, the print setting information control unit 204 causes the printer driver 202 to reset the print setting item that needs to be reset with an appropriate setting value and resolves the conflict.

Figure 9:
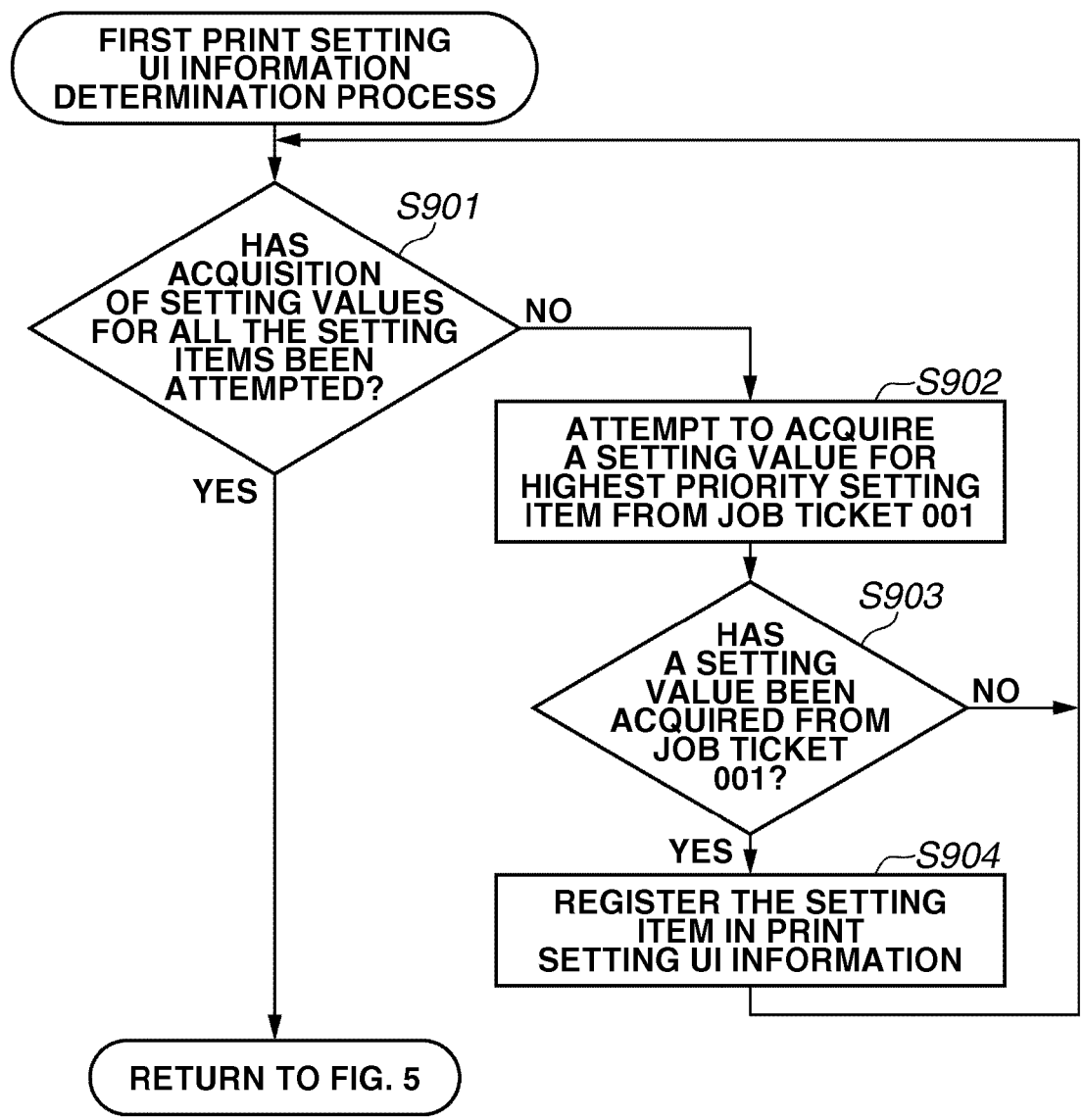
FIG. 9 is a flow chart illustrating a first print setting UI information determination process.

FIG. 9 is a flow chart illustrating a process (a first print setting UI information determination process) in step S505 in FIG. 5. More specifically, FIG. 9 illustrates a process of controlling print setting information. The process is executed if the client apparatus 3 includes the application 207 that can only write setting values in a job ticket for print setting items settable by a general-purpose print setting UI that is not compatible with the printer 2. First, in step S901, the print setting information control unit 204 determines whether acquisition of setting values for all the print setting items held by the printer driver 202 from the job ticket 001 has been attempted. If it is determined that acquisition of setting values for all the print setting items held by the printer driver 202 from the job ticket 001 has not been attempted (NO in step S901), the operation proceeds to step S902. In step S902, the print setting information control unit 204 attempts to acquire a setting value for the highest-priority print setting item, among all the print setting items held by the printer driver 202, from the job ticket 001.

Next, in step S903, the print setting information control unit 204 determines whether a setting value has been acquired from the job ticket 001. If it is determined that a setting value has been acquired from the job ticket 001 (YES in step S903), the operation proceeds to step S904. In step S904, the print setting information control unit 204 determines that the client apparatus 3 includes a print setting UI capable of setting a setting value for the print setting item. Thus, the print setting information control unit 204 registers the print setting item in print setting UI information. The print setting UI information holds a list of print setting items that can be set by the print setting UI included in the client apparatus 3. With this print setting UI information, the printer driver 202 can identify the print setting items that can be set by the client apparatus 3. The print setting information control unit 204 refers to the print setting UI information when executing the process in step S508 in FIG. 5. Next, the operation returns to step S901, and the print setting information control unit 204 repeats the process for all the print setting items held by the printer driver 202. After processing all the print setting items held by the printer driver 202, the print setting information control unit 204 ends the process in the flow chart in FIG. 9. In this way, the print setting information control unit 204 determines which type of print setting UI is included in the client apparatus 3.

Figure 10:
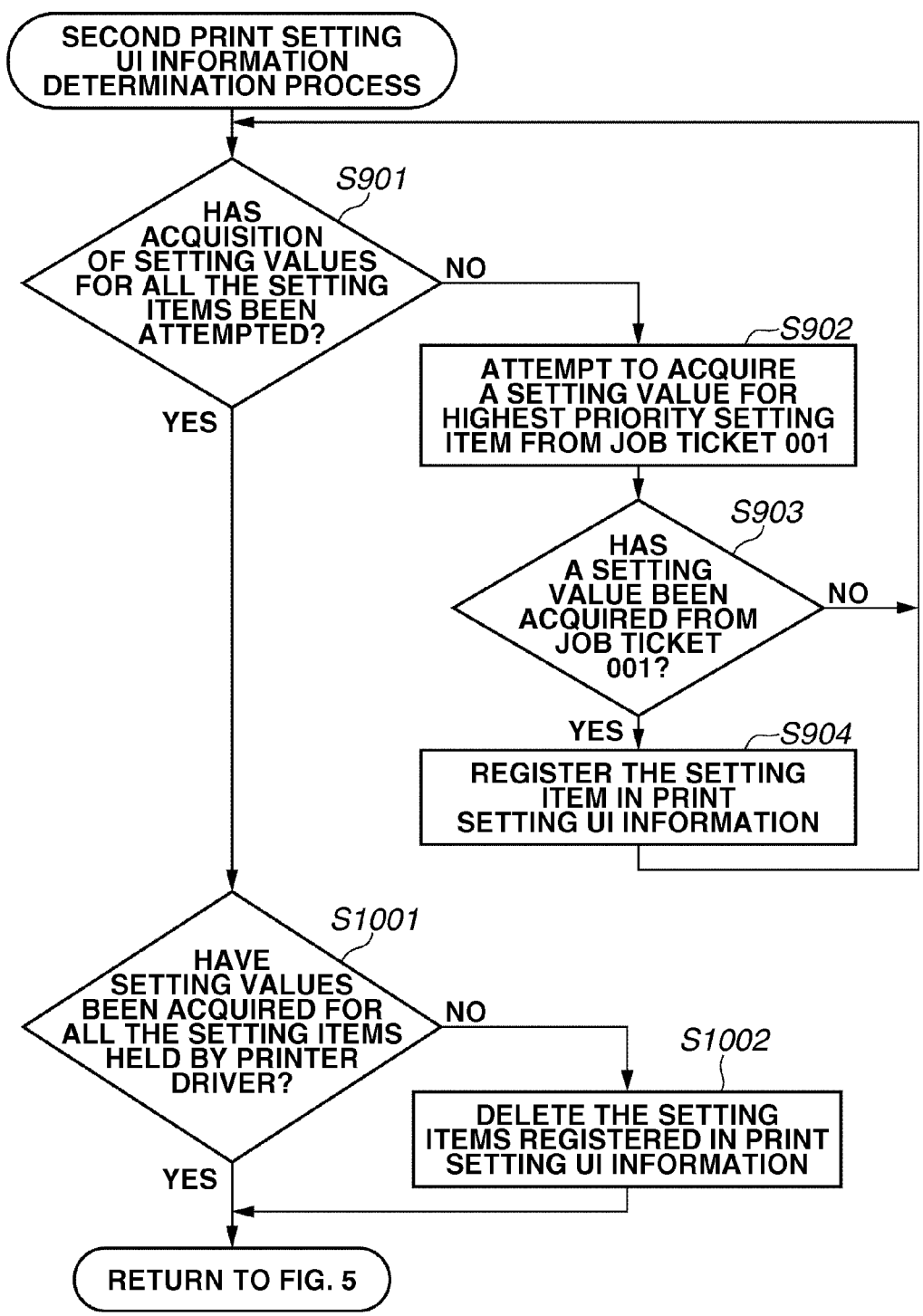
FIG. 10 is a flow chart illustrating a second print setting UI information determination process.

Alternatively, if any one of the print setting items cannot be acquired from the job ticket 001, the printer driver 202 may reset the print setting items with setting values. If the application 207 includes only a general-purpose print setting UI and the client apparatus 3 does not include a unit capable of notifying the user of an error, the user cannot recognize that the print setting item needs to be reset with a setting value. As a result, printing cannot be executed continuously. However, in the above way, such inconvenience can be avoided. FIG. 10 is a flow chart illustrating a process in this mode (a second print setting UI information determination process) executed in step S505 in FIG. 5. In FIG. 10, the same steps as those in FIG. 9 will not be described in detail. Only the steps different between FIGS. 9 and 10 will be described.

FIG. 10 includes different steps after the print setting information control unit 204 determines that acquisition of setting values for all the print setting items held by the printer driver 202 from the job ticket 001 has been attempted. Namely, as in the process in FIG. 9, among all the print setting items held by the printer driver 202, the print setting items for which setting values have been acquired from the job ticket 001 are registered in the print setting UI information. Next, in step S1001, the print setting information control unit 204 determines whether setting values have been acquired from the job ticket 001 for all the print setting items held by the printer driver 202. If it is determined that the print setting information control unit 204 determines that setting values have been acquired from the job ticket 001 for all the print setting items held by the printer driver 202 (YES in step S1001), the print setting information control unit 204 ends the process in the flow chart in FIG. 10.

On the other hand, if a setting value has not been acquired from the job ticket 001 for any one of the print setting items held by the printer driver 202 (NO in step S1001), the operation proceeds to step S1002. In step S1002, the print setting information control unit 204 deletes the print setting items registered in step S904 from the print setting UI information. In this way, if the job ticket 001 lacks any one of the necessary print setting items, the print setting information control unit 204 determines that the client apparatus 3 does not include a unit capable of setting sufficient print settings and, therefore, deems such client apparatus 3 as a client apparatus having no print setting UI. If the client apparatus 3 is determined to have such a print setting UI, the printer driver 202 will reset the print setting items with appropriate setting values to resolve the conflict.

Thus, in the present exemplary embodiment, the print setting information control unit 204 determines whether print setting items necessary for the printer driver 202 are written (set) in the job ticket 001, to estimate the functions of the client apparatus 3. Based on the results, the print setting information control unit 204 switches the conflict resolution process. Next, specific examples of the process executed by the print setting information control unit 204 will be described, assuming that the printer driver 202 has the print setting items "paper size," "paper type," "borderless printing," "two-sided printing," and "paper feed port," while the client apparatus 3 is a mobile terminal including a print setting UI having only the print setting times "paper size" and "two-sided printing." In addition, in the following specific examples, since the client apparatus 3 cannot recognize all the functions of the printer 2, only the setting values for the settable "paper size" and "two-sided printing" are written in a generated job ticket 001. More specifically, the following specific examples will be described, assuming that the setting values "A5" and "ON" are set for "paper size" and "two-sided printing," respectively, in the job ticket 001.

Under the above conditions, in step S503 in FIG. 5, the print setting information control unit 204 sets default values as the setting values for "paper type," "borderless printing," and "paper feed port" in the job ticket 002. Next, in step S504, the print setting information control unit 204 overwrites the job ticket 002 with the information "A5" and "ON" in the job ticket 001, as the setting values for "paper size" and "two-sided printing." Based on the data table 600 in FIG. 6, the default values for the print setting items other than "paper size" and "two-sided printing" are set as follows: paper type; plain paper, borderless printing; OFF, and paper feed port; tray A (the default values are represented by double circles in FIG. 6).

Next, in step S505, the print setting information control unit 204 determines which type of print setting UI is included in the client apparatus 3, by executing the first print setting UI information determination process illustrated in FIG. 9. In this step, based on the information acquired from the job ticket 001, the print setting information control unit 204 determines that the client apparatus 3 includes a print setting UI capable of setting the print setting items "paper size" and "two-sided printing." Next, in step S506, the print setting information control unit 204 checks the contents of the job ticket 002 in which setting values are set for all the print setting items. Next, in step S507, the print setting information control unit 204 determines whether a conflict of setting values is caused among the print setting items, based on the priorities uniquely held by the printer driver 202. In this example, the setting values for "paper type," "borderless printing," and "paper size" represent "plain paper," "OFF," and "A5," respectively. Thus, based on the data table 600 in FIG. 6, the setting value for "paper feed port" is limited to "tray B." However, "tray A" has been set in step S503 as a default value in the job ticket 002. Namely, the print setting information control unit 204 determines that the setting value for "paper feed port" causes a conflict with the setting values for the other print setting items (YES in step S507). Thus, the operation proceeds to step S508.

According to the first conflict resolution switching process in FIG. 7, in step S702, the print setting information control unit 204 determines that a print setting item that needs to be reset is "paper feed port," based on the priorities uniquely held by the printer driver 202. However, in step S505, the print setting information control unit 204 has determined that the client apparatus 3 includes a print setting UI capable of setting only the print setting items "paper size" and "two-sided printing." Namely, since the client apparatus 3 does not include a unit capable of setting the print setting item "paper feed port" (NO in step S703), the printer driver 202 cannot request the user to reset the print setting item "paper feed port." Thus, in step S705, the print setting information control unit 204 determines that the printer driver 202 changes the setting value for "paper feed port" to the selectable "tray B" to resolve the conflict.

According to the second conflict resolution switching process in FIG. 8, since the client apparatus 3 does not include a print setting UI capable of setting the print setting item "paper feed port" that needs to be reset (NO in step S703), the operation proceeds to step S801. In step S801, the print setting information control unit 204 determines whether the client apparatus 3 includes a print setting UI capable of setting another print setting item that can solve the conflict. Based on the data table 600 in FIG. 6, if the setting value for "paper size" is changed to "A4," "tray A" can be selected for "paper feed port." Namely, the print setting information control unit 204 determines whether the client apparatus 3 includes a print setting UI capable of setting a setting value for "paper size." In this example, the print setting UI of the client apparatus 3 can set "paper size" (YES in step S801), the print setting information control unit 204 notifies the user of conflict information to request that the setting value for "paper size," which is settable by the client apparatus 3, should be reset.

As described above, in the present exemplary embodiment, based on the setting values for the print setting items in the job ticket 400 sent from the client apparatus 3, the host computer 1 determines the print setting items settable by the print setting UI of the client apparatus 3. Next, based on the priorities (data table 600) uniquely held by the printer driver 202, the host computer 1 determines whether a conflict of setting values is caused among the print setting items. If it is determined that the host computer 1 determines a conflict, the host computer 1 selects a print setting item causing the conflict as the print setting item that needs to be reset, based on the priorities uniquely held by the printer driver 202. If the print setting UI of the client apparatus 3 does not include the print setting item that needs to be reset, the printer driver 202 resets the print setting item with an appropriate setting value. In this way, in the present exemplary embodiment, if a conflict is caused by a setting value that cannot be set by the client apparatus 3, the printer driver 202 resolves the conflict to continue print processing. If the client apparatus 3 can change setting values for only some of the print setting items and if the host computer 1 sends an error message to the client apparatus 3 to request resetting of a print setting item whose setting value cannot be changed by the client apparatus 3, printing may not be executed continuously. However, the embodiments can avoid such inconvenience. In addition, if the print setting UI of the client apparatus 3 does not have all the print setting items, the printer driver 202 may reset the setting values for all the print setting items. Thus, even if the client apparatus 3 does not have an error notification unit and cannot recognize information about resetting of a setting value when a conflict is caused, printing can be executed continuously.

Next, a second exemplary embodiment will be described. In the following description, the figures used in the first exemplary embodiment and the detailed description of those figures will be omitted. Only the different features will be described. Among the processes executed by the print setting information control unit 204 in the first exemplary embodiment, the processes in FIGS. 5, 7, and 8 are also applicable in the present exemplary embodiment. The present exemplary embodiment is different from the first exemplary embodiment in the process of determining the print setting items that can be set by the print setting UI included in the client apparatus 3 (see FIGS. 9 and 10). In the present exemplary embodiment, the print setting items that can be set by the print setting UI included in the client apparatus 3 are determined, based on setting values for the print setting items acquired from a job ticket.

Figure 11:
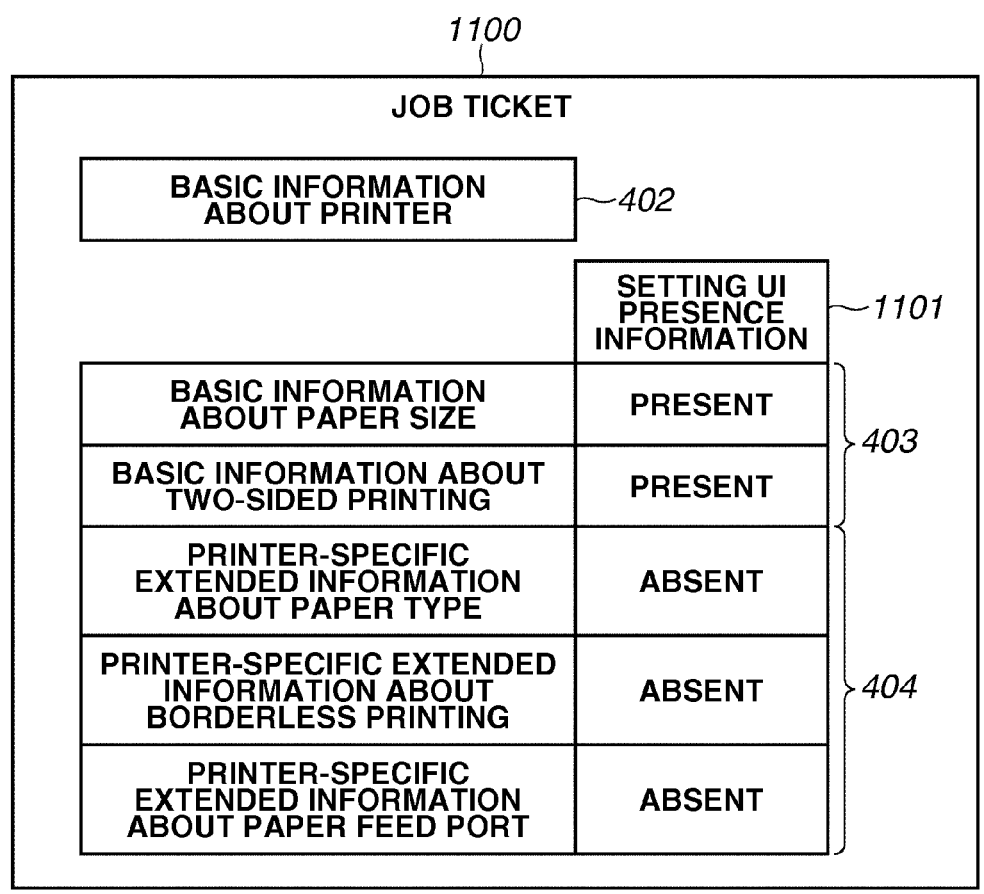
FIG. 11 illustrates a third example of the job ticket data configuration.

The present exemplary embodiment will be described based on the client apparatus 3, assuming that the application 207 can grasp information about functions of the printer 2 and write some setting values for the print setting items in the job ticket 001, while the application 207 includes only a general-purpose print setting UI. In the present exemplary embodiment, the application 207 adds information to a job ticket, the information indicating whether the client apparatus 3 includes a unit capable of setting values for various print setting items. With this information, the host computer 1 can determine whether the client apparatus 3 can change the setting values for the print setting items settable by the host computer 1. FIG. 11 illustrates a data configuration of a job ticket generated by the application 207. More specifically, the application 207 adds setting UI presence information 1101 to -the job ticket 001 (1100), as the information indicating whether the client apparatus 3 includes a unit capable of setting values of the print setting items.

Figure 12:
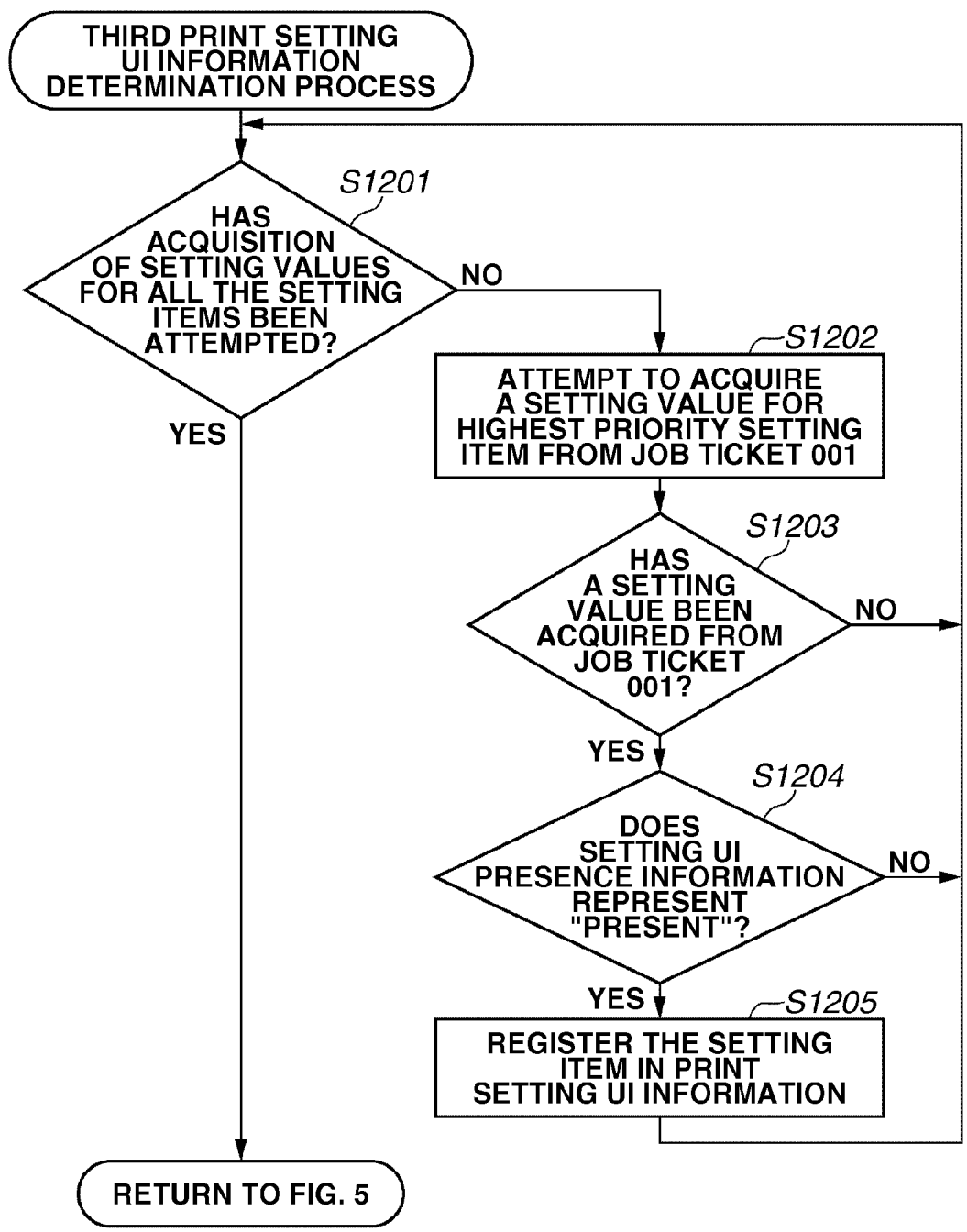
FIG. 12 is a flow chart illustrating a third print setting UI information determination process.

FIG. 12 is a flow chart illustrating a process (a third print setting UI information determination process) executed in step S505 in FIG. 5. First, in step S1201, the print setting information control unit 204 determines whether acquisition of setting values for all the print setting items held by the printer driver 202 from the job ticket 001 has been attempted. If it is determined that acquisition of setting values for all the print setting items held by the printer driver 202 from the job ticket 001 has not been attempted (NO in step S1201), the operation proceeds to step S1202. In step S1202, the print setting information control unit 204 attempts to acquire a setting value for the highest-priority print setting item, among all the print setting items held by the printer driver 202, from the job ticket 001.

Next, in step S1203, the print setting information control unit 204 determines whether a setting value has been acquired from the job ticket 001. If it is determined that a setting value has been acquired from the job ticket 001 (YES in step S1203), the operation proceeds to step S1204. In step S1204, the print setting information control unit 204 determines whether the setting value of the setting UI presence information 1101 for the corresponding printing setting item represents "present."

If it is determined that the setting value of the setting UI presence information 1101 represents "present" and the client apparatus 3 includes a unit capable of setting the print setting item for which a setting value has been acquired (YES in step S1204), the operation proceeds to step S1205. In S1205, the print setting information control unit 204 registers the print setting item in the print setting UI information. Next, the operation returns to step S1201, and the print setting information control unit 204 repeats the process for all the print setting items held by the printer driver 202. After processing all the print setting items held by the printer driver 202, the print setting information control unit 204 ends the process in the flow chart in FIG. 12.

If it is determined in step S1203 that a setting value cannot be acquired from the job ticket 001, the operation returns to step S1201. In addition, if it is determined in step S1204 that the setting value of the setting UI presence information 1101 represents "absent," the operation returns to step S1201. In this way, the print setting information control unit 204 determines which type of print setting UI is included in the client apparatus 3. The process of determining which type of print setting UI is included in the client apparatus 3 is not limited to the above process. For example, the setting UI presence information 1101 may be added only to the print setting items that can be set by the print setting UI, instead of all the print setting items (the basic information 403 and the extended information 404) in the job ticket 1100.

Thus, in the present exemplary embodiment, the client apparatus 3 adds the setting UI presence information 1101 for indicating which print setting items can be set by the unit of the client apparatus 3 to the print setting items in the job ticket 1100. In this way, the host computer 1 estimates which functions are included in the client apparatus 3 more accurately and switches the conflict resolution process accordingly.

For example, assuming that the printer driver 202 can set the print setting items "paper size," "paper type," "borderless printing," "two-sided printing," and "paper feed port" and that the client apparatus 3 is a mobile terminal including a print setting UI capable of setting only the print setting items "paper size" and "two-sided printing," the mobile terminal as the client apparatus 3 acquires information about functions of the printer 2 from the printer driver 202 via the printing system 201 of the OS of the host computer 1 via a network. Then, the client apparatus 3 fills the acquired function information (print setting items) with some setting values and generates the job ticket 001.

In this case, unlike the first exemplary embodiment, the host computer 1 cannot determine that the client apparatus 3 includes a print setting UI capable of setting the print setting items, simply based on the information about whether setting values have been acquired for the print setting items from the job ticket 001. Thus, the client apparatus 3 clearly specifies information about the print setting UI included in the client apparatus 3 in each print setting item as the setting UI presence information. In this way, the host computer 1 can determine the functions of the client apparatus 3. More specifically, the client apparatus 3 generates the job ticket 001 in which the setting value "present" is written for each of the print setting items "paper size" and "two-sided printing" as the setting UI presence information, in addition to the setting values for these print setting items. In this example, other than the print setting items "paper size" and "two-sided printing," the client apparatus 3 also writes some setting values for other print setting items "paper type" and "borderless printing" as well as the setting value "absent" as the setting UI presence information.

After receiving the job ticket 001, in step S504 in FIG. 5, the printer driver 202 overwrites the job ticket 002, in which default values are set, with the setting values written in the job ticket 001. In this case, a default value is set only for the paper feed port, and the setting values set by the client apparatus 3 are set in the other print setting items "paper size," "two-sided printing," "paper type," and "borderless printing." Next, in step S505, the printer driver 202 determines which type of print setting UI is included in the client apparatus 3, based on the third print setting UI information determination process in FIG. 12. In this case, among the print setting items "paper size," "paper type," "borderless printing," and "two-sided printing" acquired from the job ticket 001, the setting value "present" as the setting UI presence information is set only for the print setting items "paper size" and "two-sided printing." Thus, the printer driver 202 determines that the client apparatus 3 includes a print setting UI capable of setting the print setting items "paper size" and "two-sided printing."

In this way, in the present exemplary embodiment, the printer driver 202 accurately determines the print setting items that can be set by the client apparatus 3 and resolves a conflict of setting values among the other print setting items to continue printing. If the client apparatus 3 can change setting values for only some of the print setting items and if the host computer 1 sends an error message to the client apparatus 3 to request resetting of a print setting item whose setting value cannot be changed by the client apparatus 3, printing may not be executed continuously. However, the present exemplary embodiment can avoid such inconvenience.

Figure 13:
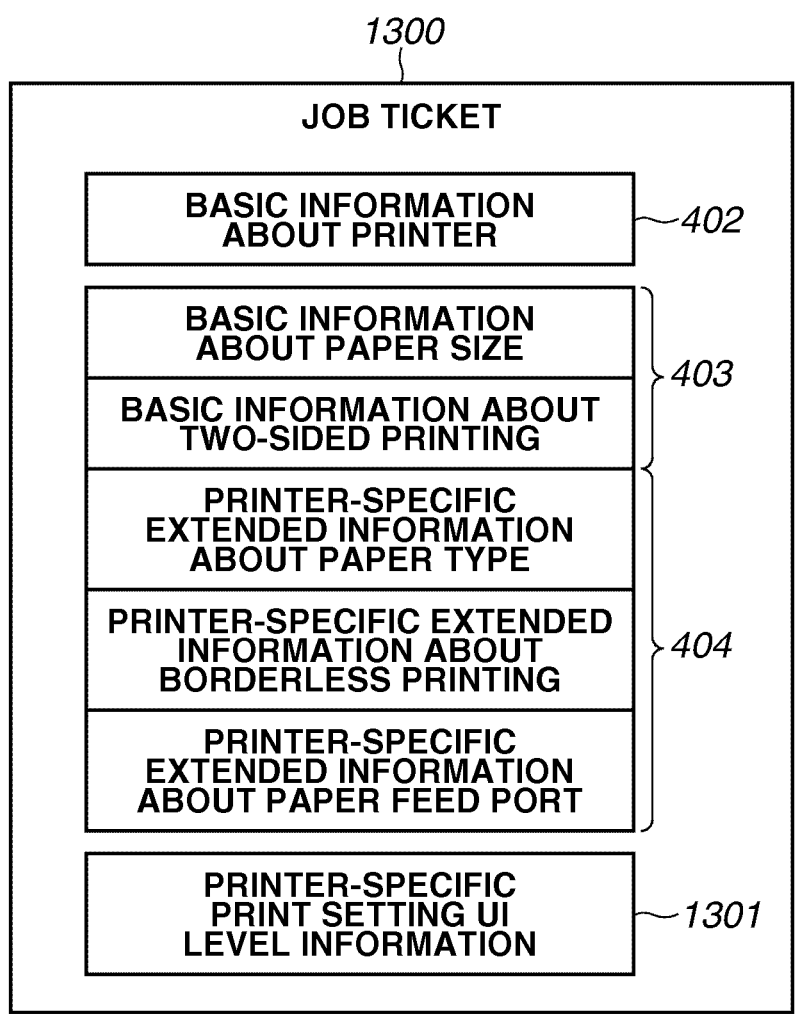
FIG. 13 illustrates a fourth example of the job ticket data configuration.

Next, a third exemplary embodiment will be described. In the following description, the figures used in the first and second exemplary embodiments and the detailed description of those figures will be omitted. Only the different features will be described. Among the processes executed by the print setting information control unit 204 in the first exemplary embodiment, the processes in FIGS. 5, 7, and 8 are also applicable in the present exemplary embodiment. The present exemplary embodiment is different from the first and second exemplary embodiments in the process of determining the print setting items that can be set by the print setting UI included in the client apparatus 3 (see FIGS. 9, 10, and 12). In the present exemplary embodiment, the client apparatus 3 writes information for identifying which print setting items can be set (specified) by the client apparatus 3 in a job ticket. The host computer 1 determines the print setting items that can be set by the print setting UI included in the client apparatus 3, based on setting values in the information. More specifically, in the present exemplary embodiment, the application 207 adds print setting UI level information to a job ticket, the information identifying the print setting items for which the client apparatus 3 can set setting values. FIG. 13 illustrates a data configuration of the job ticket generated by the application 207. The application 207 adds print setting UI level information 1301 previously defined by the printer driver 202 to the job ticket 001 (1300).

Figure 14:
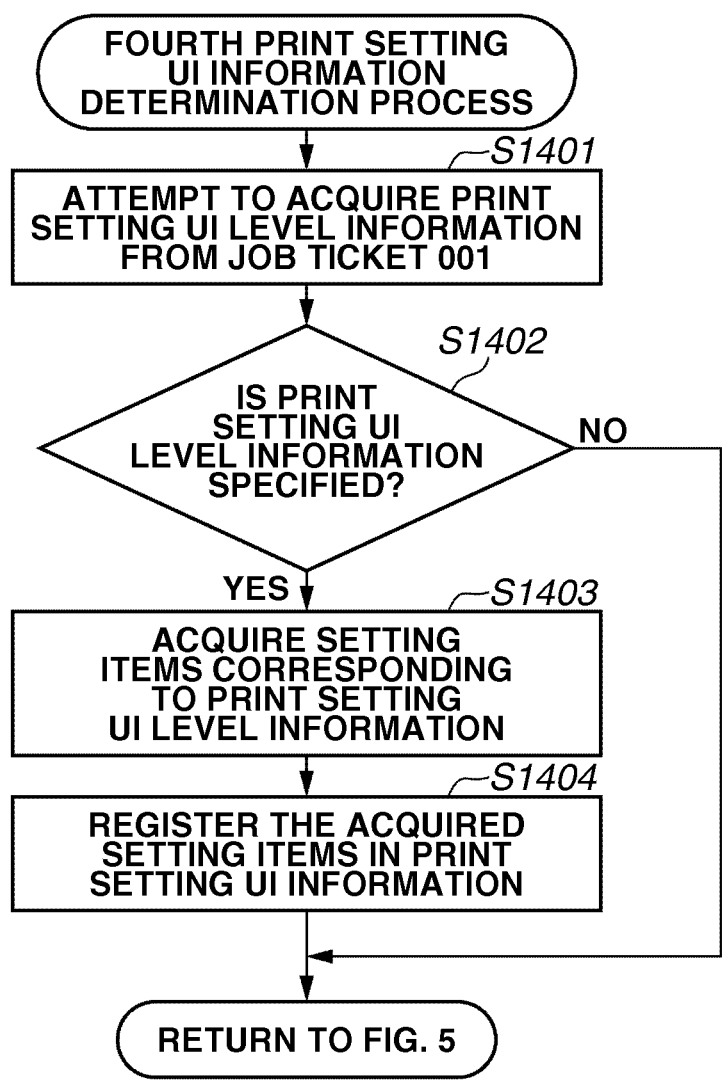
FIG. 14 is a flow chart illustrating a fourth print setting UI information determination process.

FIG. 14 is a flow chart illustrating a process (a fourth print setting UI information determination process) executed in step S505 in FIG. 5. First, in step S1401, the print setting information control unit 204 attempts to acquire the print setting UI level information 1301 from the job ticket 001, the information 1301 identifying the print setting items for which the client apparatus 3 can set setting values. FIG. 15 illustrates a UI level definition table 1501 defining the contents of the print setting UI level information 1301. The UI level definition table 1501 stores UI levels and various types of print setting item information corresponding to the respective UI levels. The UI level definition table 1501 is previously defined by the printer driver 202. For example, level 0 represents that all the print setting items are high-priority items (a conflict of setting values among these print setting items is resolved preferentially). For example, level 0 is given as a setting value of the print setting UI level information 1301 when the client apparatus 3 uses a print setting UI provided by the printer driver 202. Such UI level information defined in this way is written in the job ticket 001 as a setting value of the print setting UI level information 1301. In the present exemplary embodiment, if the client apparatus 3 can set none of the print setting items, no UI level information is specified (see "Not Specified" in FIG. 15).

Referring back to FIG. 14, in step S1402, the print setting information control unit 204 determines whether the print setting UI level information 1301 is specified in the job ticket 001. If it is determined that the print setting UI level information 1301 is not specified in the job ticket 001 (NO in step S1402), the print setting information control unit 204 ends the process in the flow chart in FIG. 14. On the other hand, if the print setting UI level information 1301 is specified in the job ticket 001 (YES in step S1402), the operation proceeds to step S1403. In step S1403, the print setting information control unit 204 refers to the UI level definition table 1501 and acquires print setting items corresponding to the specified print setting UI level information 1301.

Next, in step S1404, the print setting information control unit 204 determines that the client apparatus 3 includes a print setting UI capable of setting the print setting items acquired in step S1403 and registers the print setting items in the print setting UI information. In this way, the print setting information control unit 204 determines which type of print setting UI is included in the client apparatus 3.

Thus, in the present exemplary embodiment, the client apparatus 3 previously selects UI level information based on the print setting UI included in the client apparatus 3 and adds the UI level information to the job ticket 001. In this way, since the client apparatus 3 can clearly specify functions of the client apparatus 3 in the job ticket 001, the printer driver 202 can estimate the functions of the client apparatus 3 more accurately.

Next, a fourth exemplary embodiment will be described. In the following description, the figures used in the first to third exemplary embodiments and the detailed description of the figures will be omitted. Only the different features will be described. The present exemplary embodiment is different from the first to third exemplary embodiments in the process of setting appropriate setting values for all the print setting items necessary for the printer 2 to execute printing. In the present exemplary embodiment, default values are not set as setting values for print setting items. Instead, contents of job ticket information added to a print job are analyzed, and a process of setting appropriate setting values is executed, to determine priority items used as references.

Figure 16:
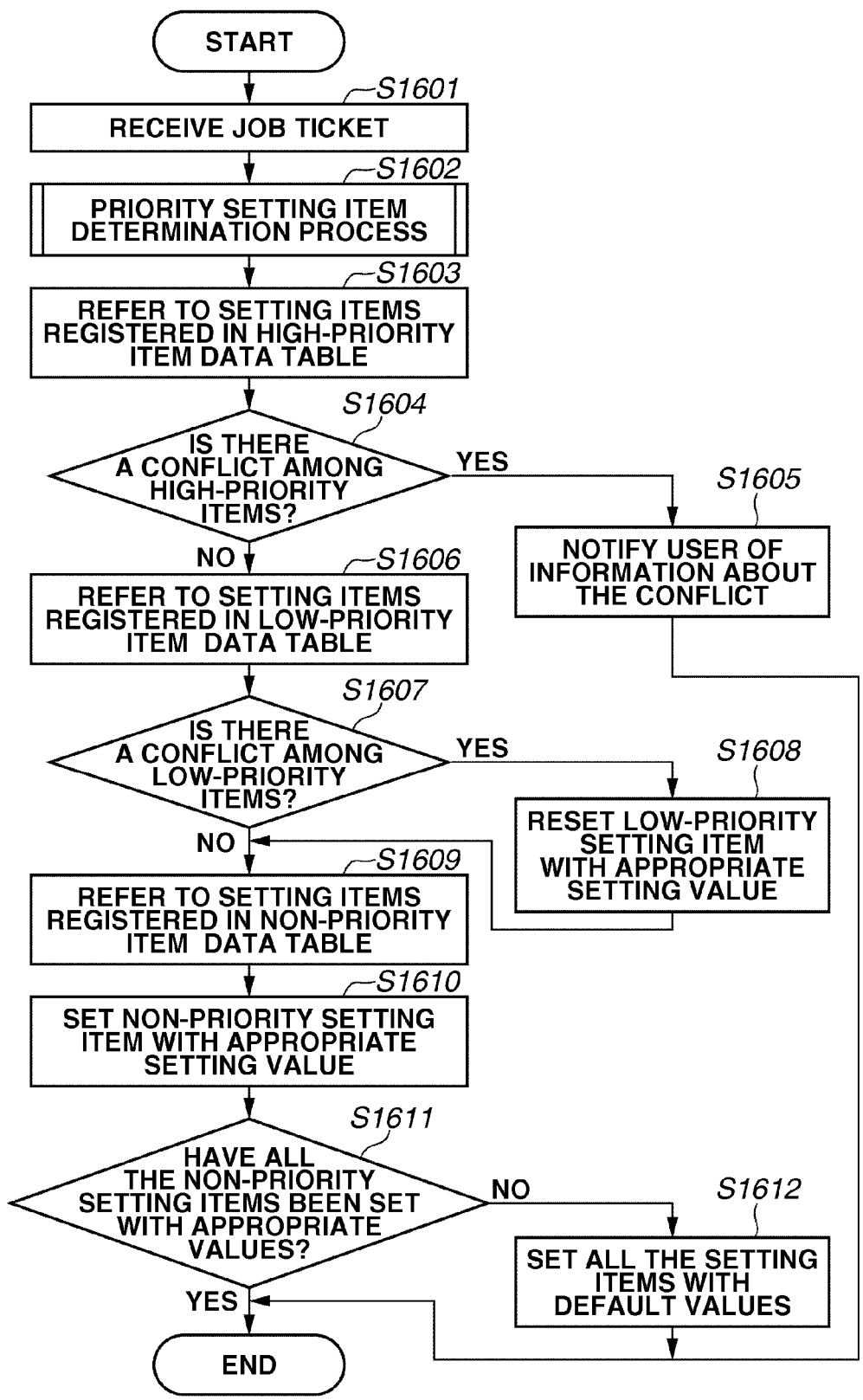
FIG. 16 is a flow chart illustrating a second example of the process executed by the print setting information control unit during print processing.

FIG. 16 is a flow chart illustrating a process executed by the print setting information control unit 204 of the printer driver 202 in the host computer 1. First, in step S1601, the print setting information control unit 204 receives print setting information added to the print job as a job ticket from the application 207. Next, in step S1602, the print setting information control unit 204 executes a priority setting item determination process to determine priority print setting items among all the print setting items held by the printer driver 202. More specifically, the print setting information control unit 204 classifies all the print setting items held by the printer driver 202 into a high-priority item data table, a low-priority item data table, and a non-priority item data table. In this way, the print setting information control unit 204 determines priority print setting items. This process in step S1602 will be described in the following.

Figure 17:
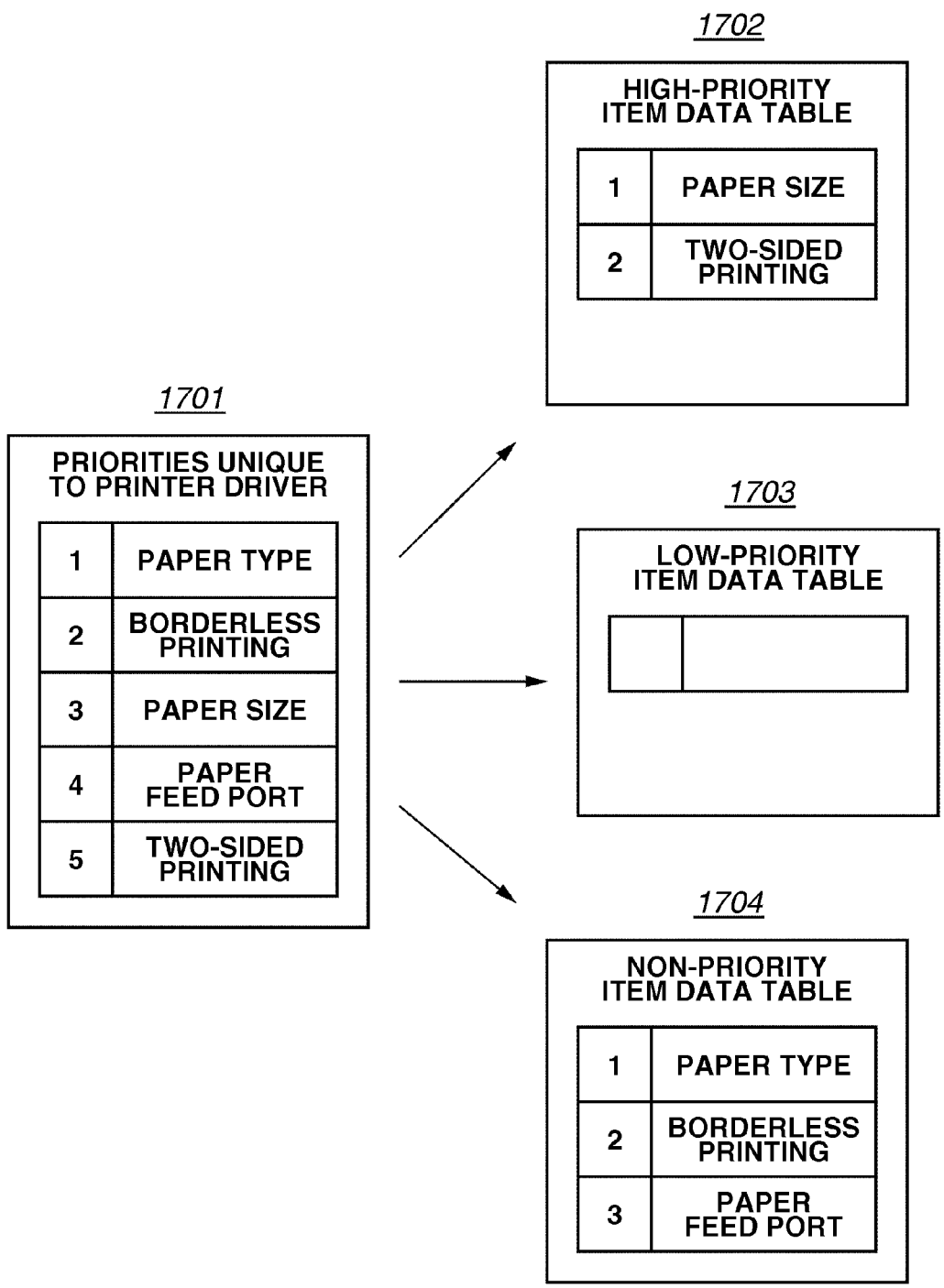
FIG. 17 illustrates a classification method of print setting items in a job ticket.

FIG. 17 illustrates a process of classifying the print setting items in the job ticket into the high-priority item data table, the low-priority item data table, and the non-priority item data table. In FIG. 17, priority information 1701 represents priorities of the print setting items and is unique to the printer driver 202. The priority information 1701 is previously set in the host computer 1. First, the print setting items determined to have the highest priority are registered in a high-priority item data table 1702. Next, the print setting items determined to have a priority lower than that of the high-priority items are registered in a low-priority item data table 1703. The other print setting items, which are determined to be other than the high-priority items or the low-priority items, are registered in a non-priority item data table 1704. The data in these high-priority item data table 1702, low-priority item data table 1703, and non-priority item data table 1704 is used only in the printer driver 202. Therefore, an arbitrary data format may suitably be used for the high-priority item data table 1702, low-priority item data table 1703, and non-priority item data table 1704.

Referring back to FIG. 16, as described above, in step S1602, the print setting information control unit 204 executes the priority setting item determination process on all the print setting items held by the printer driver 202. As a result, all the print setting items held by the printer driver 202 are classified into the high-priority item data table 1702, the low-priority item data table 1703, and the non-priority item data table 1704. Next, in step S1603, the print setting information control unit 204 refers to the print setting items registered in the high-priority item data table 1702. Next, in step S1604, the print setting information control unit 204 determines whether a conflict of setting values is caused among the high-priority items.

If it is determined that setting values that cannot coexist are set in the high-priority item data table 1702 (YES in step S1604), the operation proceeds to step S1605. In step S1605, the print setting information control unit 204 notifies and requests the user that a print setting item should be reset, and ends the process in the flow chart in FIG. 16. On the other hand, if the print setting information control unit 204 determines that there is no conflict of setting values among a plurality of high-priority items (NO in step S1604), the operation proceeds to step S1606. If only one print setting item is registered in the high-priority item data table 1702, the print setting information control unit 204 does not need to determine whether a conflict of setting values is caused. Thus, in such case, the operation proceeds to step S1606.

In step S1606, the print setting information control unit 204 refers to the print setting items registered in the low-priority item data table 1703. Next, in step S1607, the print setting information control unit 204 determines whether a conflict of setting values is caused among the low-priority items. If it is determined that setting values that cannot coexist are set in the low-priority items (YES in step S1607), the operation proceeds to step S1608. In step S1608, based on the print setting items uniquely held by the printer driver 202, the print setting information control unit 204 determines a low-priority item having the highest priority and resets the low-priority item with an appropriate setting value.

On the other hand, if the print setting information control unit 204 determines that there is no conflict of setting values among a plurality of low-priority items (NO in step S1607), the operation proceeds to S1609. If only one print setting item is registered in the low-priority item data table 1703, the print setting information control unit 204 does not need to determine whether a conflict of setting values is caused. Thus, in such case, the operation proceeds to step S1609 from step S1607. In addition, if no print setting item is registered in the low-priority item data table 1703, the operation proceeds to step S1609 from step S1607.

Next, the print setting information control unit 204 executes a process of checking the other remaining print setting items that are not registered as the high-priority item data table 1702 or the low-priority item data table 1703. First, in step S1609, the print setting information control unit 204 refers to the print setting items registered in the non-priority item data table 1704. Next, in step S1610, based on the print setting items uniquely held by the printer driver 202, the print setting information control unit 204 determines a non-priority item having the highest priority and resets the non-priority item with an appropriate setting value while satisfying the setting values for the above high-priority and low-priority items. If the reset setting value causes a conflict with a combination of setting values of the high-priority items and the low-priority items, which are the higher-priority items than the non-priority items, the print setting information control unit 204 resets the non-priority print setting item with a settable appropriate setting value.

Next, in step S1611, the print setting information control unit 204 determines whether appropriate setting values have been set for all the non-priority items. If it is determined that appropriate setting values have not been set for all the non-priority items (NO in step S1611), the operation proceeds to step S1612. Namely, if setting values cannot be set for the non-priority items because of a combination of setting values of the high-priority items and the low-priority items, which are the higher-priority items than the non-priority items, the operation proceeds to step S1612. In step S1612, the print setting information control unit 204 sets default values held by the printer driver 202 for all the non-priority items and ends the process in the flow chart in FIG. 16. On the other hand, if, in step S1611, the print setting information control unit 204 determines that appropriate setting values have been set for all the non-priority items (YES in step S1611), the print setting information control unit 204 ends the process in the flow chart in FIG. 16.

Figure 18:
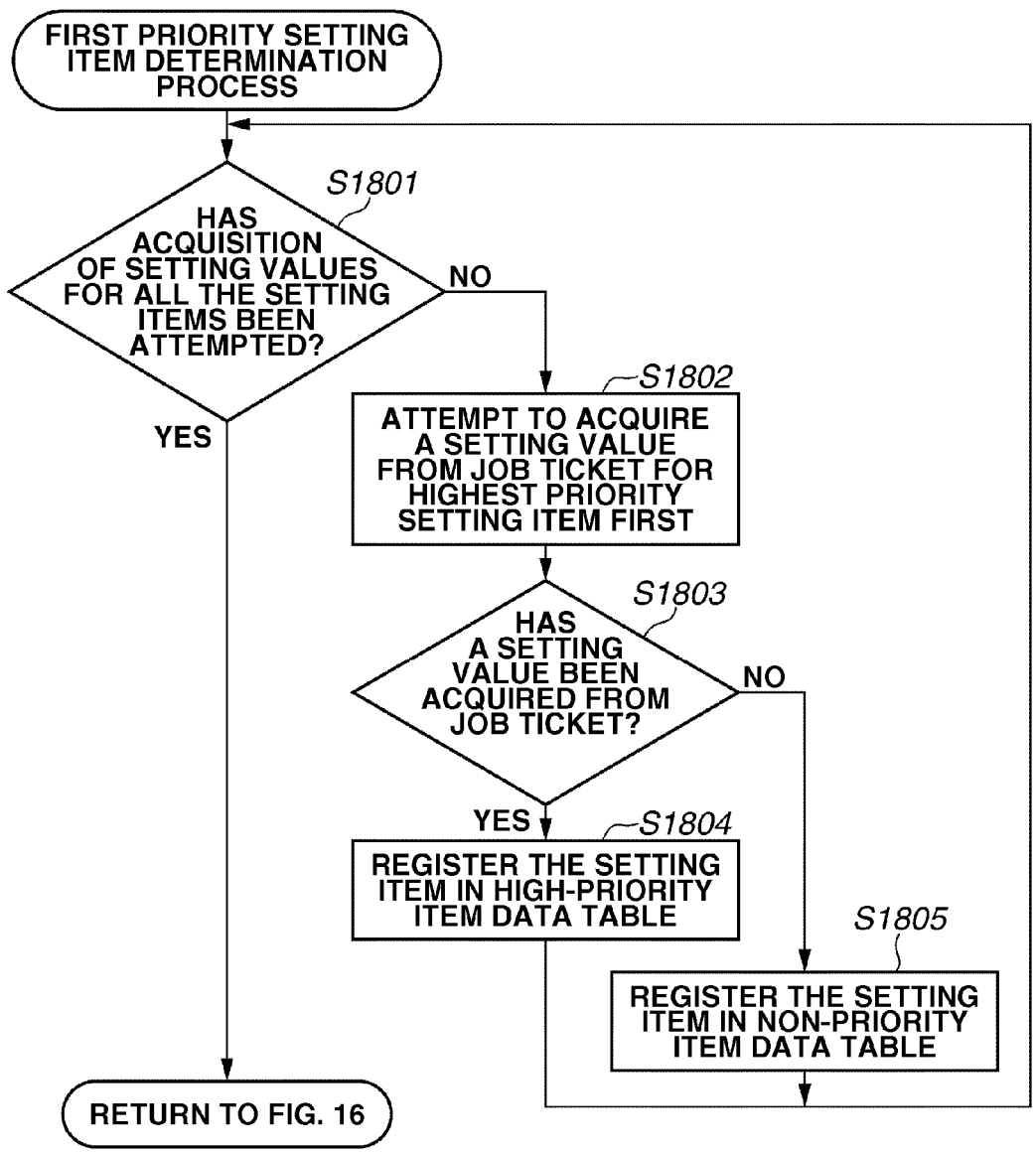
FIG. 18 is a flow chart illustrating a first priority setting item determination processing.

FIG. 18 is a flow chart illustrating a process (a first priority setting item determination process) in step S1602 in FIG. 16. More specifically, FIG. 18 illustrates a process of controlling print setting information. The process is executed if the client apparatus 3 includes the application 207 that can only write setting values in a job ticket for print setting items settable by a general-purpose print setting UI that is not compatible with the printer 2. First, in step S1801, the print setting information control unit 204 determines whether acquisition of setting values for all the print setting items held by the printer driver 202 from the job ticket has been attempted. If it is determined that acquisition of setting values for all the print setting items held by the printer driver 202 from the job ticket has not been attempted (NO in step S1801), the operation proceeds to step S1802. In step S1802, the print setting information control unit 204 attempts to acquire a setting value for the highest-priority print setting item, among all the print setting items held by the printer driver 202, from the job ticket.

Next, in step S1803, the print setting information control unit 204 determines whether a setting value has been acquired from the job ticket. If it is determined that a setting value has been acquired from the job ticket (YES in step S1803), the operation proceeds to step S1804. In step S1804, the print setting information control unit 204 registers the print setting item, for which the setting value has been acquired, in the high-priority item data table 1702. On the other hand, if no setting value has been acquired from the job ticket (NO in step S1803), the operation proceeds to step S1805. In step S1805, the print setting information control unit 204 registers the print setting item, for which no setting value has been acquired, in the non-priority item data table 1704. Next, the operation returns to step S1801, and the print setting information control unit 204 repeats the process until all the print setting items held by the printer driver 202 are classified into the above tables. After all the print setting items held by the printer driver 202 are classified into the high-priority item data table 1702 and the non-priority item data table 1704, the print setting information control unit 204 ends the process in the flow chart in FIG. 18. In this way, based on the example illustrated in FIG. 18, the print setting information control unit 204 determines the print setting items registered in the high-priority item data table 1702 to be the priority print setting items (high-priority items).

Figure 19:
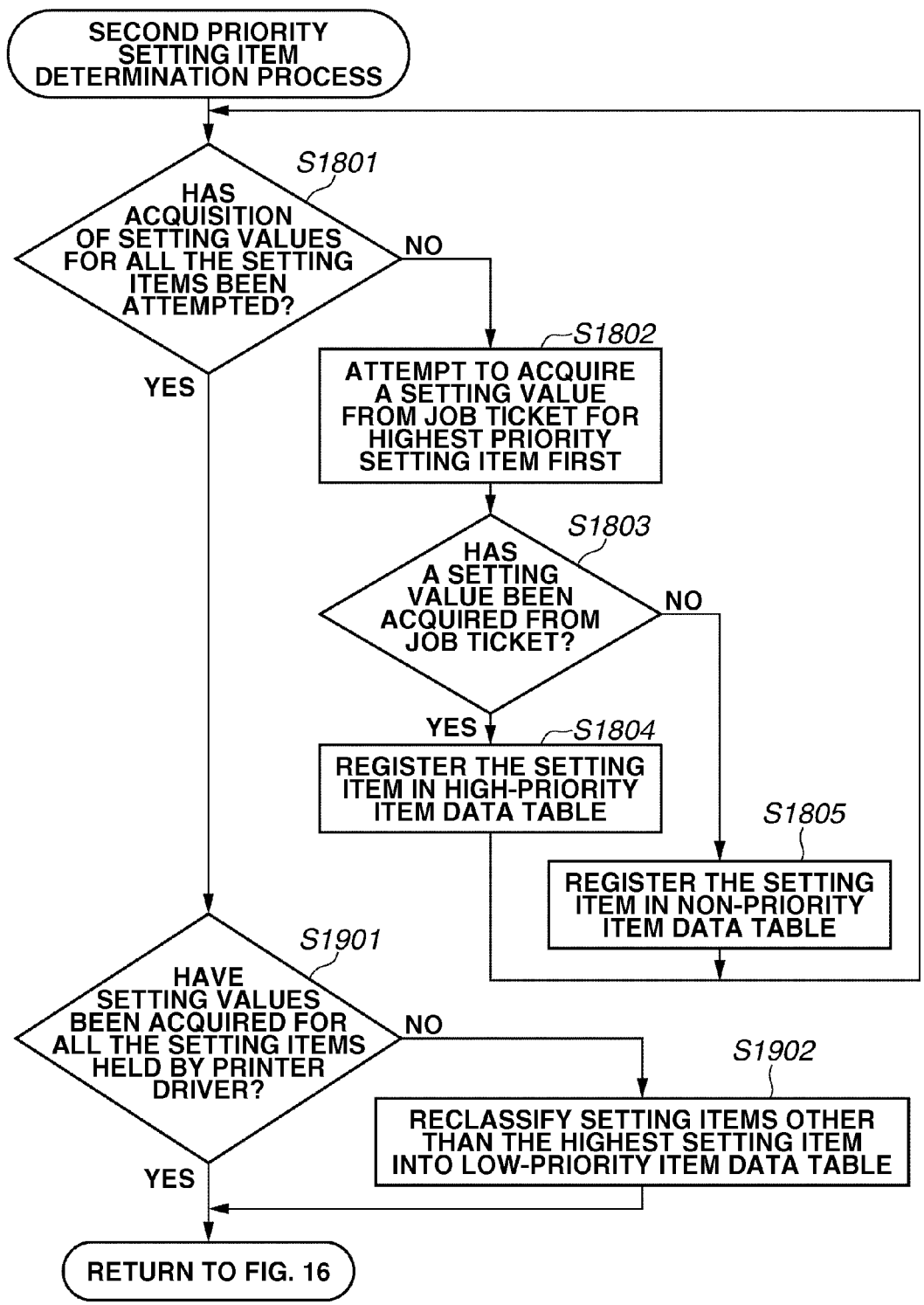
FIG. 19 is a flow chart illustrating a second priority setting item determination processing.

Alternatively, if all the print setting items are not acquired from the job ticket, among the print setting items acquired from the job ticket, only a print setting item having the highest priority in the printer driver 202 may be determined as the high-priority item. If the application 207 includes only a general-purpose print setting UI and the client apparatus 3 does not include a way of notifying the user of an error, the user cannot recognize that the print setting item needs to be reset with a setting value. As a result, printing cannot be executed continuously. However, in the above way, such inconvenience can be avoided. FIG. 19 is a flow chart illustrating a process in this mode (a second priority setting item determination process) executed in step S1602 in FIG. 16. In FIG. 19, the same steps as those in FIG. 18 will not be described in detail. Only the steps different between FIGS. 18 and 19 will be described.

First, as in the process in FIG. 18, the print setting items, for which setting values have been acquired from the job ticket, are registered in the high-priority item data table 1702, and the print setting items, for which setting values have not been acquired from the job ticket, are registered in the non-priority item data table 1704. This process is repeated until all the print setting items held by the printer driver 202 are registered. Next, in step S1801, if the print setting information control unit 204 determines that acquisition of setting values for all the print setting items held by the printer driver 202 from the job ticket has been attempted (YES in step S1801), the print setting information control unit 204 determines that all the print setting items held by the printer driver 202 have been classified into the tables. Next, the operation proceeds to step S1901.

In step S1901, the print setting information control unit 204 determines whether setting values have been acquired for all the print setting items held by the printer driver 202 from the job ticket. If it is determined that setting values have been acquired for all the print setting items held by the printer driver 202 from the job ticket (YES in step S1901), the print setting information control unit 204 ends the process in the flow chart in FIG. 19. On the other hand, if setting values have not been acquired for all the print setting items held by the printer driver 202 from the job ticket (NO in step S1901), the operation proceeds to step S1902. In step S1902, among the print setting items registered in the high-priority item data table 1702, the print setting information control unit 204 leaves only one print setting item having the highest priority in the high-priority item data table 1702. Namely, the print setting information control unit 204 executes a reclassification process by registering the other print setting items in the low-priority item data table 1703. Thus, the print setting information control unit 204 determines the print setting item registered in the high-priority item data table 1702 to be the high-priority item and the print setting items registered in the low-priority item data table 1703 to be the low-priority items.

In this way, in the present exemplary embodiment, the print setting information control unit 204 determines the priority print setting items, depending on whether the print setting items required by the printer driver 202 are written (set) in the job ticket. Namely, based on the print setting item information written in the job ticket, the print setting information control unit 204 estimates which functions are included in the client apparatus 3 and executes a process accordingly. Next, specific examples of the process executed by the print setting information control unit 204 will be described, assuming that the printer driver 202 has the print setting items "paper size," "paper type," "borderless printing," "two-sided printing," and "paper feed port," while the client apparatus 3 is a mobile terminal including a print setting UI having only the print setting times "paper size" and "two-sided printing." In addition, in the following specific examples, since the client apparatus 3 cannot recognize all the functions of the printer 2, only the setting values for the settable paper size and two-sided printing are written in a generated job ticket. By causing the printer driver 202 in the host computer 1 that has received this job ticket to deem that the print setting items "paper size" and "two-sided printing" have a higher priority than the originally-set priorities of the print setting items, the printer 2 can execute printing based on user instructions more faithfully.

More specifically, in step S1602 in FIG. 16, the print setting information control unit 204 registers the print setting items "paper size" and "two-sided printing" acquired from the job ticket in the high-priority item data table 1702. On the other hand, the print setting information control unit 204 registers the print setting items "paper type," "borderless printing," and "paper feed port" that cannot be acquired from the job ticket in the non-priority item data table 1704. Next, in step S1604, the print setting information control unit 204 determines whether a conflict of setting values is caused between the print setting items "paper size" and "two-sided printing" registered in the high-priority item data table 1702. Based on the data table 600 in FIG. 6, "paper size" has a higher priority than "two-sided printing." Assuming that "2L"

is set as the setting value for "paper size" and "ON" is set as the setting value for "two-sided printing," based on the data table 600 in FIG. 6, the setting value for "two-sided printing" is limited to "OFF" by the setting value 2L for "paper size." Thus, the print setting information control unit 204 determines that a combination of these setting values cannot coexist (YES in step S1604). Thus, in step S1605, the print setting information control unit 204 notifies the user that a conflict of setting values is caused among the print setting items and requests the user that the setting value for "two-sided printing" having a lower priority should be reset to "OFF."

If "2L" is set as the setting value for "paper size" and "OFF" is set as the setting value for "two-sided printing," there is no conflict of setting values among the print setting items. Thus, in such case, the print setting information control unit 204 determines that a combination of these setting values for the print setting items can coexist (NO in step S1604). Thus, in step S1607, the print setting information control unit 204 checks whether there is a conflict of setting values among the low-priority items registered in the low-priority item data table 1703. However, in this example, since no print setting items exist as the low-priority items. Thus, the operation proceeds to step S1610, and the print setting information control unit 204 determines whether the other print setting items "paper type," "borderless printing," and "paper feed port" registered in the non-priority item data table 1704 represent settable setting values.

The priorities of the print setting items registered in the non-priority item data table 1704 are the priorities originally uniquely held by the printer driver 202. Namely, based on the data table 600 in FIG. 6, print setting items indicated relatively on the left side are sequentially set. Thus, the print setting items need to be set so that a conflict is not caused between the setting value (2L) for "paper size" and the setting value (OFF) for "two-sided printing" that have already been determined by the high-priority item data table 1702. In this case, only "glossy paper" can be selected as the setting value for "paper type" indicated on the leftmost side in the data table 600. Accordingly, "glossy paper" is set as the setting value for "paper type."

In addition, if the setting values "2L," "OFF," and "glossy paper" are set for the print setting items "paper size," "two-sided printing," and "paper type," respectively, "ON" or "OFF" can be selected as the setting value for "borderless printing." If a plurality of selectable setting values exists, the default value "OFF" is set as the setting value for "borderless printing." Next, if the setting values "2L," "OFF," "glossy paper," and "OFF" are set for the print setting items "paper size," "two-sided printing," "paper type," and "borderless printing," respectively, only "tray A" can be selected as the setting value for "paper feed port." Accordingly, "tray A" is set as the setting value for "paper feed port."

In this way, the print setting information control unit 204 sets all the print setting items with appropriate setting values and realizes printing based on user instructions more faithfully. If the client apparatus 3 can change setting values for only some of the print setting items and if the host computer 1 sends an error message to the client apparatus 3 to request resetting of a print setting item whose setting value cannot be changed by the client apparatus 3, printing may not be executed continuously. However, the embodiments can avoid such inconvenience. In addition, even if the client apparatus 3 does not have an error notification unit and cannot recognize information about resetting of a setting value when a conflict is caused, printing can be executed continuously.

Next, a fifth exemplary embodiment will be described. In the following description, the figures used in the first to fourth exemplary embodiments and the detailed description of those figures will be omitted. Only the different features will be described. The process in FIG. 16 described in the fourth exemplary embodiment is also applicable in the present exemplary embodiment. The present exemplary embodiment is different from the fourth exemplary embodiment in the process in step S1602. In the present exemplary embodiment, based on information indicating whether the client apparatus 3 includes a way of setting values for print setting items acquired from a job ticket, high-priority items are determined. More specifically, in the present exemplary embodiment, a process of controlling print setting information will be described based on the client apparatus 3, assuming that the application 207 can grasp information about functions of the printer 2 and write setting values for the print setting items in the job ticket, while the application 207 includes only a general-purpose print setting UI. In the present exemplary embodiment, as in the second exemplary embodiment, the application 207 adds the setting UI presence information 1101 to the job ticket, as the information indicating whether the client apparatus 3 includes a way of setting values for various print setting items (see FIG. 11).

Figure 20:
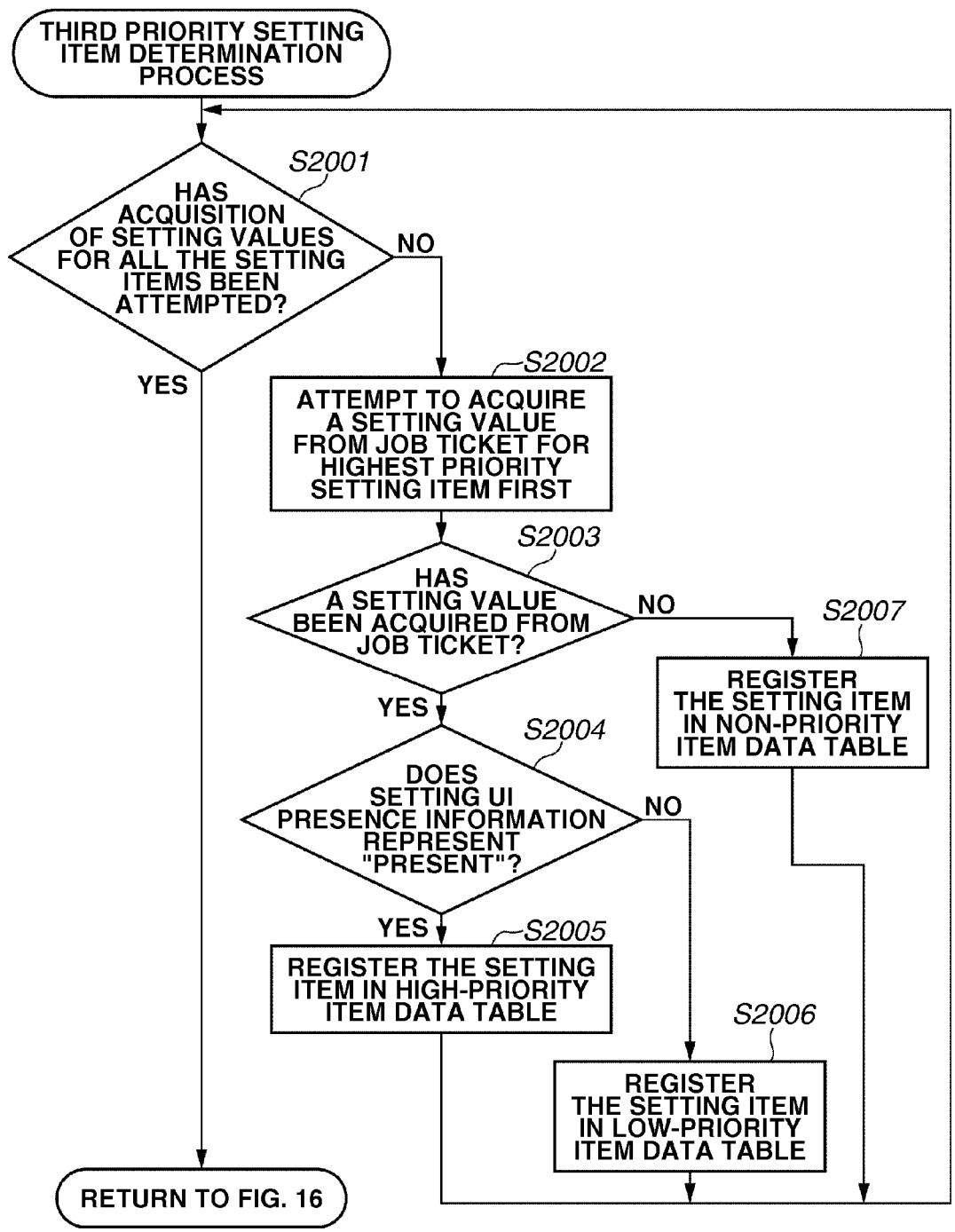
FIG. 20 is a flow chart illustrating a third priority setting item determination processing.

FIG. 20 is a flow chart illustrating a process (a third priority setting item determination process) executed in step S1602 in FIG. 16. First, in step S2001, the print setting information control unit 204 determines whether acquisition of setting values for all the print setting items held by the printer driver 202 from the job ticket has been attempted. If it is determined that acquisition of setting values for all the print setting items held by the printer driver 202 from the job ticket has not been attempted (NO in step S2001), the operation proceeds to step S2002. In step S2002, the print setting information control unit 204 attempts to acquire a setting value for the highest-priority print setting item, among all the print setting items held by the printer driver 202, from the job ticket.

Next, in step S2003, the print setting information control unit 204 determines whether a setting value has been acquired from the job ticket. If it is determined that a setting value has been acquired from the job ticket (YES in step S2003), the operation proceeds to step S2004. In step S2004, the print setting information control unit 204 determines whether the setting UI presence information 1101 represents the setting value "present." This setting value indicates whether the client apparatus 3 includes a unit capable of setting the print setting item for which the setting value has been acquired. If it is determined that the setting value of the setting UI presence information 1101 represents "present" and the client apparatus 3 includes a unit capable of setting the print setting item for which the setting value has been acquired (YES in step S2004), the operation proceeds to step S2005. In step S2005, the print setting information control unit 204 registers the print setting item, for which the setting value has been acquired in step S2003, in the high-priority item data table 1702.

On the other hand, if the setting value of the setting UI presence information 1101 represents "absent" (NO in step S2004), the operation proceeds to step S2006. Namely, while the print setting item, for which the setting value has been acquired, exists in the job ticket, if the setting value of the setting UI presence information 1101 indicates that the client apparatus 3 does not include a unit capable of setting the print setting item, the operation proceeds to step S2006. In step S2006, the print setting information control unit 204 registers the print setting item, for which the setting value has been acquired in step S2003, in the low-priority item data table 1703. If no setting value has been acquired from the job ticket (NO in step S2003), the operation proceeds to step S2007. In step S2007, the print setting information control unit 204 registers the print setting item, for which no setting value has been acquired in step S2003, in the non-priority item data table 1704. Next, the operation returns to step S2001, and the print setting information control unit 204 repeats the process until all the print setting items held by the printer driver 202 are classified into the tables. In this way, based on the example in FIG. 20, the print setting information control unit 204 determines the print setting items registered in the high-priority item data table 1702 and the low-priority item data table 1703 to be the priority print setting items (the high-priority items and the low-priority items).

Alternatively, if the setting UI presence information 1101 indicates that the print setting item cannot be set by the print setting UI, the print setting item may be registered as a non-priority item. In the present exemplary embodiment, each print setting item is classified into a relevant table, based on the setting value "present" or "absent" in the setting UI presence information 1101. However, each print setting item may be classified into a relevant table, based on a different criterion. For example, the setting UI presence information 1101 may be added only to the print setting items that can be set by the print setting UI, instead of all the print setting items (the basic information 403 and the extended information 404) in the job ticket 1100.

Thus, in the present exemplary embodiment, the print setting information control unit 204 determines the priority print setting items, based on whether the job ticket includes the print setting items required by the printer driver 202, and determines the high-priority print setting items among the priority print setting items. Namely, the client apparatus 3 adds the setting UI presence information 1101 for indicating which print setting items can be set by the unit of the client apparatus 3 to the print setting items in the job ticket. In this way, the host computer 1 estimates which functions are included in the client apparatus 3 more accurately and executes processing accordingly.

For example, assuming that the printer driver 202 can set the print setting items "paper size," "paper type," "borderless printing," "two-sided printing," and "paper feed port" and that the client apparatus 3 is a mobile terminal including a print setting UI capable of setting the print setting items "paper size" and "two-sided printing," the mobile terminal as the client apparatus 3 acquires information about functions of the printer 2 from the printer driver 202 via the printing system 201 of the OS of the host computer 1 via a network. Next, the client apparatus 3 fills the acquired function information (print setting items) with some setting values and generates the job ticket.

In this case, simply based on the information about whether setting values have been acquired for the print setting items from the job ticket, the print setting information control unit 204 cannot determine such print setting items to be the priority print setting items (the high-priority items). Thus, the client apparatus 3 clearly specifies information about the print setting UI included in the client apparatus 3 in each print setting item as the setting UI presence information. In this way, the host computer 1 can estimate the functions of the client apparatus 3 more accurately.

More specifically, in this example, the client apparatus 3 generates a job ticket in which setting values are written for the print setting items "paper size" and "two-sided printing" and the setting value "present" is written as the setting UI presence information 1101. In addition to "paper size" and "two-sided printing," the client apparatus 3 writes some setting values for the print setting items "borderless printing" and "paper type" and the setting value "absent" as the setting UI presence information 1101.

Upon receiving this job ticket, in step S1602 in FIG. 16, the printer driver 202 acquires the print setting items "paper size," "two-sided printing," "borderless printing," and "paper type" from the job ticket. Next, among the acquired print setting items, the print setting information control unit 204 registers the print setting items "paper size" and "two-sided printing," for which "present" is set as the setting value of the setting UI presence information 1101, in the high-priority item data table 1702 as the high-priority items. On the other hand, the print setting information control unit 204 registers the print setting items "borderless printing" and "paper type," for which "absent" is set as the setting value of the setting UI presence information 1101, in the low-priority item data table 1703 as the low-priority items. In addition, the print setting information control unit 204 registers the print setting item "paper feed port," which cannot be acquired from the job ticket, in the non-priority item data table 1704.

Next, in step S1604, the print setting information control unit 204 determines whether a conflict of setting values is caused between the print setting items "paper size" and "two-sided printing" registered in the high-priority item data table 1702, based on the priorities (data table 600) uniquely held by the printer driver 202. For example, if "2L" and "ON" are set as the setting values for "paper size" and "two-sided printing," based on the data table 600, the combination of setting values cannot coexist. Thus, in step S1605, the print setting information control unit 204 notifies the user of the conflict of setting values between "paper size" and "two-sided printing" and requests the user to reset the setting value for "two-sided printing" to "OFF."

However, if "2L" and "OFF" are set as the setting values for "paper size" and "two-sided printing," respectively, since there is no conflict of setting values, the print setting information control unit 204 determines that the combination of setting values can coexist. Thus, the operation proceeds to step S1607. Next, the print setting information control unit 204 checks whether the setting values (2L and OFF) for "paper size" and "two-sided printing" determined in the high-priority item data table 1702 cause a conflict with the setting values for "borderless printing" and "paper type" registered in the low-priority item data table 1703. In this step, based on the data table 600 in FIG. 6, "paper type" indicated on the leftmost side is set first. To avoid a conflict between the setting values (2L and OFF) for "paper size" and "two-sided printing," the setting value for "paper type" indicated on the leftmost side is limited only to "glossy paper," based on the data table 600.

If "plain paper" is set as the setting value for "paper type" as a print setting item set in the job ticket, a conflict of setting values is caused among "paper type," "paper size," and "two-sided printing." Thus, the operation proceeds to step S1608, and the printer driver 202 resets the setting value for "paper type" to "glossy paper." In this way, the conflict among the low-priority items is resolved. If "glossy paper" is set as the setting value for "paper type," "ON" or "OFF" can be selected as the setting value for "borderless printing." Thus, in such case, no conflict of setting values is caused among the low-priority items. If "glossy paper" is set as the setting value for "paper type" as a print setting item set in the job ticket, the setting value for "paper type" does not cause a conflict. In addition, if "glossy paper" is set as the setting value for "paper type," "ON" or "OFF" can be selected as the setting value for "borderless printing." Thus, in such case, no conflict of setting values is caused among the low-priority items.

Thus, after determining that there is no conflict of setting values among the print setting items registered in the low-priority item data table 1703, the print setting information control unit 204 executes step S1610. In step S1610, the print setting information control unit 204 sets a setting value for "paper feed port," so that no conflict of setting values (2L, OFF, glossy paper, and ON or OFF) is caused among "paper size," "two-sided printing," "paper type," and "borderless printing." Namely, the print setting information control unit 204 sets a settable appropriate setting value for the remaining print setting item "paper feed port" registered in the non-priority item data table 1704, based on the data table 600. If "2L," "OFF," "glossy paper," and "ON" or "OFF" are set as the setting values for "paper size," "two-sided printing," "paper type," and "borderless printing," only "tray A" can be selected as the setting value for "paper feed port." Thus, "tray A" is set as the setting value for "paper feed port."

In this way, since all the print setting items can be reset with appropriate setting values, printing based on user instructions can be executed more faithfully. If the client apparatus 3 can change setting values for only some of the print setting items and if the host computer 1 sends an error message to the client apparatus 3 to request resetting of a print setting item whose setting value cannot be changed by the client apparatus 3, printing may not be executed continuously. However, the embodiments can avoid such inconvenience.

Next, a sixth exemplary embodiment will be described. In the following description, the figures used in the first to fifth exemplary embodiments and the detailed description of those figures will be omitted. Only the different features will be described. The process in FIG. 16 described in the fourth exemplary embodiment is also applicable in the present exemplary embodiment. In the present exemplary embodiment, information identifying which print setting items can be set by the client apparatus 3 is written in a job ticket. The host computer 1 determines the priority items, based on the setting value information. In the present exemplary embodiment, as in the third exemplary embodiment, the application 207 adds the print setting UI level information 1301 to a job ticket, as the information identifying which print setting items can be set by the client apparatus 3 (see FIG. 13). The setting values in the print setting UI level information 1301 correspond to the UI levels in the UI level definition table 1501 in FIG. 15.

FIG. 21 is a flow chart illustrating a process (a fourth priority setting item determination process) executed in step S1602 in FIG. 16. First, in step S2101, the print setting information control unit 204 attempts to acquire the print setting UI level information 1301 identifying which print setting items can be set by the client apparatus 3 from the job ticket. Next, in step S2102, the print setting information control unit 204 determines whether the print setting UI level information 1301 is specified in the job ticket. If it is determined that the print setting UI level information 1301 is specified in the job ticket 001 (YES in step S2102), the operation proceeds to step S2103.

In step S2103, the print setting information control unit 204 refers to the UI level definition table 1501 illustrated in FIG. 15 and acquires print setting items corresponding to the specified print setting UI level information 1301. Next, in step S2104, the print setting information control unit 204 registers the print setting items acquired in step S2103 in the high-priority item data table 1702. Next, in step S2105, the print setting information control unit 204 sequentially registers the remaining print setting items other than the high-priority items in the non-priority item data table 1704.

If no print setting UI level information 1301 is specified in the job ticket 001 (NO in step S2002), the operation proceeds to step S2106. In step S2106, the print setting information control unit 204 registers all the print setting items held by the printer driver 202 in the non-priority item data table 1704. In this way, the print setting information control unit 204 determines the print setting items registered in the high-priority item data table 1702 to be the priority setting items (the high-priority items).

Thus, in the present exemplary embodiment, the client apparatus 3 previously selects UI level information based on the print setting UI included in the client apparatus 3 and adds the information to the job ticket. The printer driver 202 determines priority print setting items, based on the print setting UI level information 1301 specified by the client apparatus 3. In this way, since the client apparatus 3 can clearly specify functions thereof in the job ticket, the printer driver 202 can estimate which functions are included in the client apparatus 3 more accurately. According to the present exemplary embodiment, resetting of setting items that cannot be specified by a client apparatus can be prevented from being transmitted to the client apparatus.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-045481 filed Mar. 2, 2011, which is hereby incorporated by reference herein in its entirety.

What is claimed is:
1. An information processing apparatus comprising:
at least one processor;
a change unit configured to change a setting value to resolve conflict;
a reception unit configured to receive, from a second apparatus, a plurality of print setting items in a print job to print the print job in a printer, wherein the plurality of print setting items includes a first print setting item and a second print setting item and each print setting item is configured to specify a setting value for the print setting item;
a first determination unit configured to determine whether a conflict is caused between a first setting value for the first print setting item and a second setting value for the second print setting item; and a second determination unit configured to determine whether a setting value is set for the first print setting item and whether a setting value is set the second print setting item, wherein, in response to the first determination unit determining that a conflict is caused between the first and second setting values of the print job and the second determination unit determining that a setting value is not set for at least one of the first print setting item and the second print setting item, the change unit changes at least one of the first and second setting values of the print job to resolve the conflict, wherein, in response to the first determination unit determining that a conflict is caused between the first and second setting values of the print job and the second determination unit determining that a setting value is set for each of the first print setting item and the second print setting item, the change unit refrains from changing any of the first and second setting values of the print job, and wherein the change unit, the reception unit, the first determination unit, and the second determination unit, are implemented by the at least one processor.

2. The information processing apparatus according to claim 1, further comprising a notification unit configured to notify a message, wherein, in response to the first determination unit determining that a conflict is caused between the first and second setting values of the print job and the second determination unit determining that a setting value is set for each of the first print setting item and the second print setting item, the notification unit notifies the message to the second apparatus, and wherein the notification unit is implemented by the at least one processor.

3. The information processing apparatus according to claim 1, wherein, in a case where the change unit changes at least one of the first and second setting values of the print job to resolve the conflict, the information processing apparatus causes a printer driver to perform processing to change at least one of the first and second setting values of the print job to resolve the conflict.

4. The information processing apparatus according to claim 1, wherein a dependence relationship that exists among individual print setting items in the received plurality of print setting items provides a priority among print setting items, and wherein the priority among the print setting items is predetermined before the first determination unit determines whether a conflict is caused between the first setting value for the first print setting item and the second setting value for the second print setting item.

5. The information processing apparatus according to claim 1, wherein the information processing apparatus is a print server.

6. The information processing apparatus according to claim 1, wherein the information processing apparatus is a client apparatus.

7. A control method for an information processing apparatus, the control method comprising:

receiving, from a second apparatus, a plurality of print setting items in a print job to print the print job in a printer, wherein the plurality of print setting items includes a first print setting item and a second print setting item and each print setting item is configured to specify a setting value for the print setting item;

determining whether a conflict is caused between a first setting value for the first print setting item and a second setting value for the second print setting item;

determining whether a setting value is set for the first print setting item and whether a setting value is set the second print setting item; and changing, in response to determining that a conflict is caused between the first and second setting values of the print job and determining that a setting value is not set for at least one of the first print setting item and the second print setting item, at least one of the first and second setting values of the print job to resolve the conflict, and refraining from changing, in response to determining that a conflict is caused between the first and second setting values of the print job and determining that a setting value is set for each of the first print setting item and the second print setting item, any of the first and second setting values of the print job.

8. The control method according to claim 7, wherein, in response to determining that a conflict is caused between the first and second setting values of the print job and determining that a setting value is set for each of the first print setting item and the second print setting item, the control method further comprises notifying a message to the second apparatus.

9. The control method according to claim 7, wherein, in a case where changing includes changing at least one of the first and second setting values of the print job to resolve the conflict, the control method further comprises causing a printer driver to perform processing to change at least one of the first and second setting values of the print job to resolve the conflict.

10. A non-transitory computer-readable medium storing a program to cause an information processing apparatus to perform a control method, the control method comprising:

receiving, from a second apparatus, a plurality of print setting items in a print job to print the print job in a printer, wherein the plurality of print setting items includes a first print setting item and a second print setting item and each print setting item is configured to specify a setting value for the print setting item;

determining whether a conflict is caused between a first setting value for the first print setting item and a second setting value for the second print setting item;

determining whether a setting value is set for the first print setting item and whether a setting value is set the second print setting item; and changing, in response to determining that a conflict is caused between the first and second setting values of the print job and determining that a setting value is not set for at least one of the first print setting item and the second print setting item, at least one of the first and second setting values of the print job to resolve the conflict, and refraining from changing, in response to determining that a conflict is caused between the first and second setting values of the print job and determining that a setting value is set for each of the first print setting item and the second print setting item, any of the first and second setting values of the print job.

11. The non-transitory computer-readable medium according to claim 10, wherein, in response to determining that a conflict is caused between the first and second setting values of the print job and determining that a setting value is set for each of the first print setting item and the second print setting item, the control method further comprises notifying a message to the second apparatus.

12. The non-transitory computer-readable medium according to claim 10, wherein, in a case where changing includes changing at least one of the first and second setting values of the print job to resolve the conflict, the control method further comprises causing a printer driver to perform processing to change at least one of the first and second setting values of the print job to resolve the conflict.

* * * * *